United States Patent
Sellars et al.

(10) Patent No.: US 8,383,871 B1
(45) Date of Patent: Feb. 26, 2013

(54) METHOD OF HYDROGASIFICATION OF BIOMASS TO METHANE WITH LOW DEPOSITABLE TARS

(76) Inventors: Brian G. Sellars, Coquitlam (CA); Matthew L. Babicki, West Vancouver (CA); Bowie G. Keefer, Galiano Island (CA); Edson Ng, North Vancouver (CA)

( * ) Notice: Subject to any disclaimer, the term of this patent is extended or adjusted under 35 U.S.C. 154(b) by 0 days.

(21) Appl. No.: 13/223,968

(22) Filed: Sep. 1, 2011

Related U.S. Application Data

(60) Provisional application No. 61/380,096, filed on Sep. 3, 2010.

(51) Int. Cl.
*C07C 1/20* (2006.01)

(52) U.S. Cl. .............................. 585/240; 208/67; 208/68

(58) Field of Classification Search .................. None
See application file for complete search history.

(56) References Cited

U.S. PATENT DOCUMENTS

| | | | | |
|---|---|---|---|---|
| 5,504,259 | A * | 4/1996 | Diebold et al. | 568/697 |
| 2007/0272538 | A1* | 11/2007 | Satchell | 201/35 |
| 2010/0228062 | A1* | 9/2010 | Babicki et al. | 585/240 |
| 2010/0251615 | A1* | 10/2010 | Marker et al. | 48/127.7 |

* cited by examiner

*Primary Examiner* — Tam M Nguyen
(74) *Attorney, Agent, or Firm* — Klarquist Sparkman, LLP

(57) ABSTRACT

Embodiments of a thermochemical method to convert lignocellulosic biomass to a useful fuel are disclosed in a process sequence resulting in low levels of depositable tars in the output gas stream. One disclosed embodiment comprises performing a sequence of steps at elevated pressure and elevated hydrogen partial pressure, including fast (or flash) hydropyrolysis of a lignocellulosic biomass feed followed sequentially with catalytically enhanced reactions for the formation of methane operating at moderate temperatures of from about 400° C. to about 650° C. and under moderately elevated pressure (about 5 atm to about 50 atm). A temperature rise in the catalyst above pyrolysis temperature is achieved without the addition of air or oxygen. Gas residence time at elevated temperature downstream of methane formation zones is extended well beyond the time required for methane formation. This sequence results in low depositable tars in the output gas stream.

21 Claims, 6 Drawing Sheets

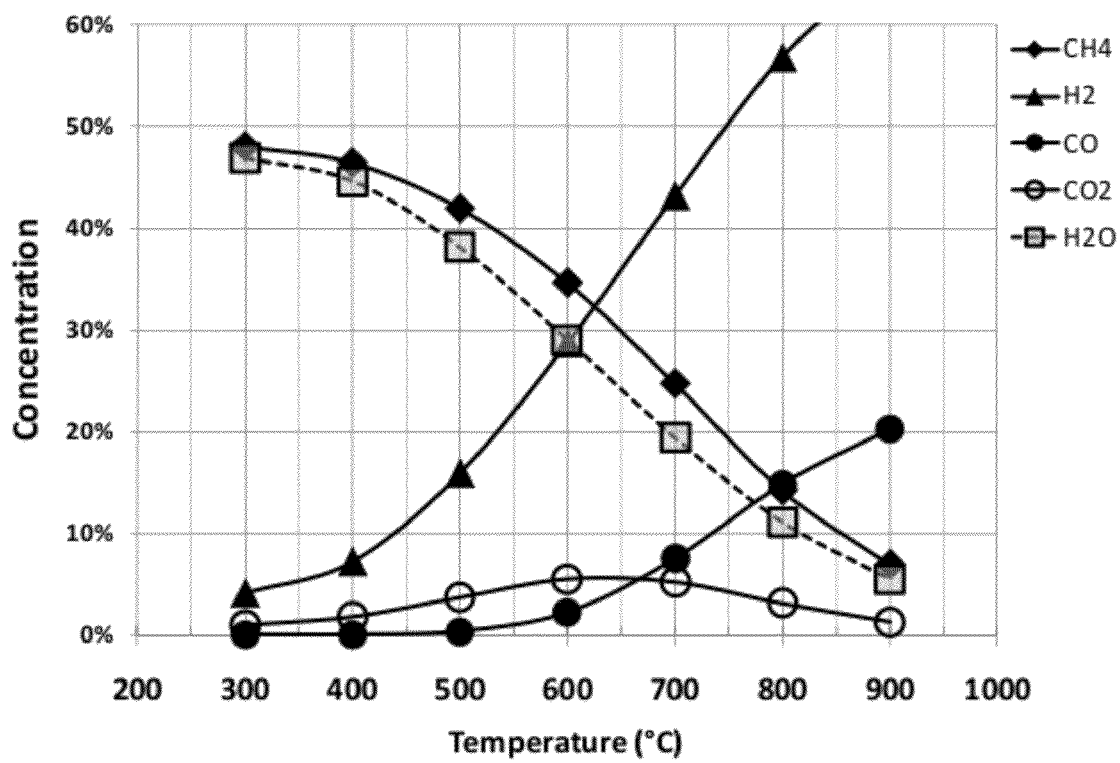

Laboratory Reactor Configuration (shown inverted)

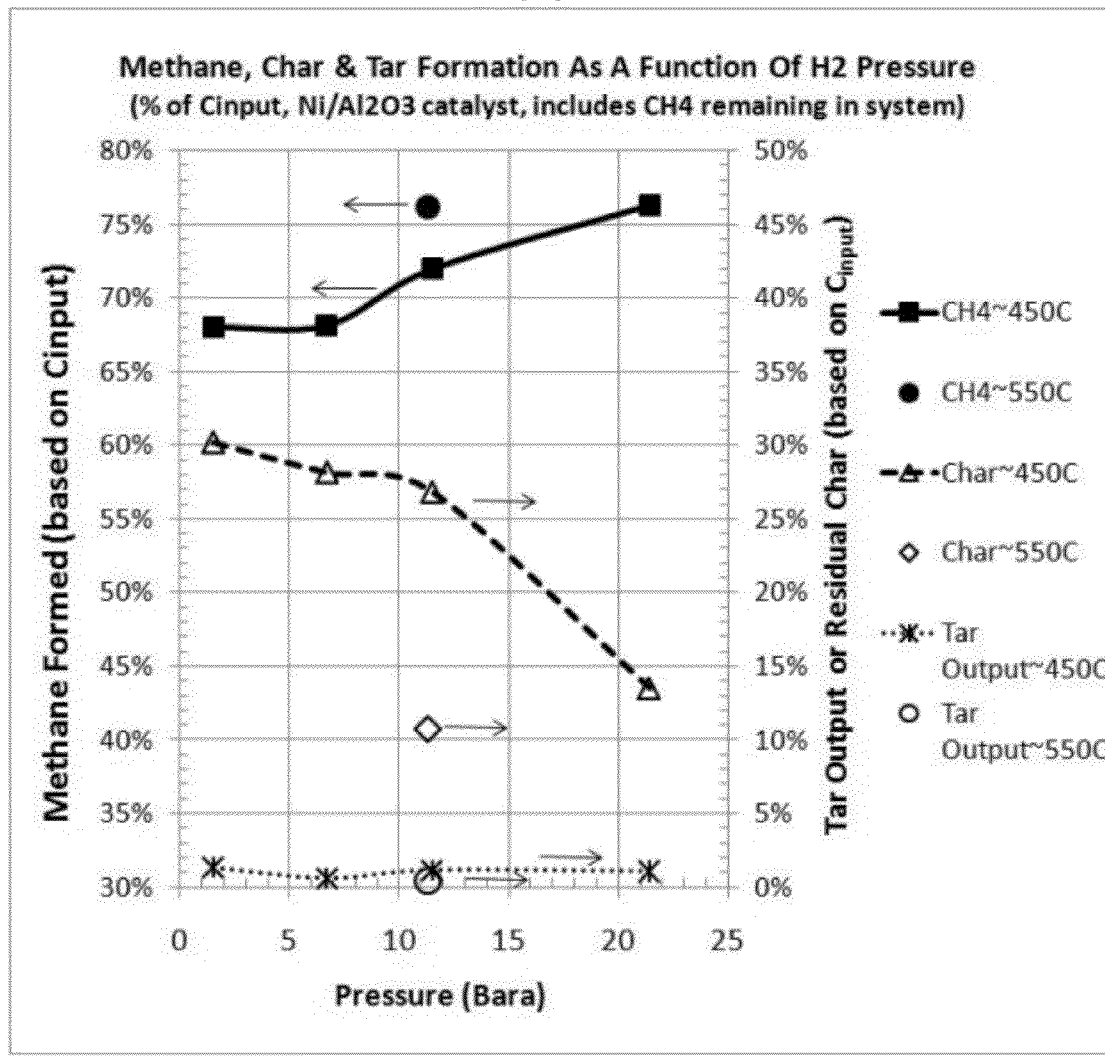

METHOD OF HYDROGASIFICATION OF BIOMASS TO METHANE WITH LOW DEPOSITABLE TARS

CROSS REFERENCE TO RELATED APPLICATION

This application claims the benefit of the earlier filing date of U.S. Provisional Application 61/380,096, which was filed on Sep. 3, 2010, and is incorporated herein by reference. This application also relates to co-pending U.S. patent application Ser. No. 12/718,533, filed Mar. 5, 2010, which claims the benefit of U.S. Provisional Application No. 61/157,788, filed Mar. 5, 2009, both of which are incorporated herein by reference.

FIELD

The present embodiments concern a thermochemical process for hydro-gasification of biomass feed stocks, such as lignocellulosic materials, including forestry residues or lignocellulosic waste materials, to generate higher value hydrocarbon fuels, in particular methane plus aromatic and/or phenolic compounds with low levels of depositable tars.

BACKGROUND

The field of thermo-chemical conversion of biomass has been under investigation for centuries but has received considerable scientific attention since the 1980's as a potential source for renewable hydrocarbon fuels.

Preferentially useful fuel products are hydrocarbons with high energy content such as methane, alkanes, olefins and light aromatic hydrocarbons. Synthesis gas ($CO+H_2$) is a less preferred fuel product but is still valued as an intermediate for further chemical processing to liquid fuels and chemicals.

Gasification Versus Pyrolysis:

The gasification of coal and biomass has been undertaken for over a century. Moses disclosed an improved design for a coal gasifier in U.S. Pat. No. 1,727,892 in 1929 with numerous other examples disclosed since then.

It is known that processes for the gasification of coal and lignocellulosic biomass become fundamentally different due to the chemical makeup and thermal behavior of these materials despite similarities in the sequence of thermo-chemical processes within the gasification process.

A review of biomass gasification technology was compiled by Knoef [Knoef H., ed., "Handbook Biomass Gasification", BTG biomass technology group B. V., NL, September 2005] and is incorporated by reference. In general, the object of biomass gasification is the production of 'synthesis gas' (CO+$H_2$) or 'producer gas' (synthesis gas plus a small fraction of methane) by the thermally induced destruction of biomass polymers with added steam and/or oxygen to primarily form simple gaseous compounds typified by synthesis gas or producer gas.

It is generally known that all forms of lignocellulosic biomass thermochemical gasification progress through a sequence of: drying (removal of free and bound water); thermal pyrolysis as the temperature of the biomass particle rises from near ambient to above the pyrolysis temperature; and reaction of pyrolysis products up to maximum gasifier temperature in order to produce a low molecular weight gaseous stream. Raising the temperature of reactants to achieve pyrolysis is endothermic and requires the supply of heat. In addition, the formation reaction for synthesis gas ($H_2$+CO) from pyrolysis products is endothermic. The heat required for both reactions is typically supplied by the addition of superheated steam or partial oxidation using oxygen or air. The extension of reaction conditions beyond temperatures required for thermal pyrolysis of the biomass feedstock is to further react pyrolysis products towards synthesis gas or producer gas. This is a key differentiator between pyrolysis processes and gasification processes.

Biomass pyrolysis produces non-condensable gas, water, condensable tars and char. Biopolymers such as cellulose, hemi-cellulose, lignin and others are converted by pyrolysis into gaseous compounds at elevated temperature.

Biomass Tars:

One of the key barriers to commercialization is the tendency of biomass thermo-chemical process systems to form carbonaceous 'tar' deposits inside process equipment resulting in lengthy process disruptions and costly maintenance and repair requirements.

An extensive review of biomass tars was undertaken by Evans et al in 1998 [Milne, T A., Evans, R. J., and Abatzoglou, N., US National Renewable Energy Laboratory report NREL/TP-570-25357, "Biomass Gasifier 'Tars': Their Nature, Formation, and Conversion Efforts", November, 1998] and is incorporated here by reference. A recent review of biomass tars was undertaken by Li and Suzuki [Li, C. and Suzuki, K, "Tar property, analysis, reforming mechanism and model for biomass gasification—An overview", Renewable and Sustainable Energy Reviews, 13 (2009) 594-604] and is incorporated here by reference.

'Tars' are not well defined in the literature despite several efforts to categorize them. The term 'tar' is insufficient and misleading with respect to forming deposits as not all tars compounds will tend to form deposits. Generally, biomass derived 'tars' are considered to be non-water chemical compounds that condense upon cooling to ambient temperature, including benzene. This grouping of tar compounds is often referred to as 'gravimetric tar' and relates to its measurement method.

Efforts have resulted in improved biomass tar classification systems based on thermo-chemical properties, chemical makeup and the ability of chemical species to be identified using gas chromatographic techniques. These efforts have resulted in the sub-classification of tars into five categories, however, the categories are only indirectly related to their general propensity of the tars to form deposits.

Elliott reviewed the composition of biomass pyrolysis products and gasifier tars from various processes and observed the chemical transition as a function of process temperature and residence time [Elliott, D. C., "Relation of Reaction Time and Temperature to Chemical Composition of Pyrolysis Oils," in Soltes, E. J. and Milne, T A., ed., ACS Symposium Series 376, Pyrolysis Oils from Biomass", Denver, Colo., April 1987]. Elliot observed the transformation in the following sequence for tars in biomass gasifiers:

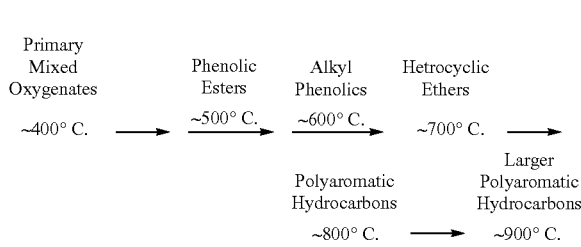

Baker et al observed that increases in process severity results in reduced levels of tars but those tars remaining are increasingly intractable and difficult to decompose [Baker, E. G.; Brown, M. D.; Elliott, D. C.; Mudge, L. K. *"Characterization and treatment of tars and biomass gasifiers"*, PNL-SA-16148; CONF-880850-19, August 1988].

Tars produced by biomass pyrolysis are considered to be 'primary' tars. "Pyrolysis vapors" are produced by pyrolysis only generally contain in excess of 50% tars if the conventional definition of gravimetric tars is used. It is generally understood in the art that the 'primary tar' chemical species resulting from biomass pyrolysis are derived from fragments of the biopolymers within the biomass as observed by Evans et al [Evans, R J and Milne, T A., *"Molecular Characterization of the Pyrolysis of Biomass. 1. Fundamentals,"* Energy & Fuels 1 (2), pp. 123-138] which is incorporated by reference.

Bio-oil is produced by the rapid cooling of pyrolysis vapors.

In biomass gasification processes, the pyrolysis vapors are quickly reacted to form synthesis gas or producer gas within the gasifier. Gases exiting the gasifier contain much lower levels of 'tars' than biomass pyrolysis vapors as most of the primary tars have reacted to form synthesis gas.

It is generally known that a significant fraction of pyrolysis vapors are light oxygenated compounds such as alcohols, ethers, ketones, aldehydes, carboxylic acids containing zero, one, two or three carbon atoms within their molecular structure in addition to the oxygen containing functional group. Another fraction of pyrolysis vapors are light oxygenated compounds such as alcohols, ethers, ketones, aldehydes, carboxylic acids containing one aromatic group within their molecular structures in addition to the oxygen containing functional group. These 'light oxygenates' and 'light oxygenated aromatics' are considered to be 'tars' within the definition of gravimetric tars. Most of the light oxygenate and light oxygenated aromatic compounds in pyrolysis gas condense to liquids at ambient temperature. Some of these compounds can condense on cooler downstream surfaces to form deposits. In addition, some of these compounds can react with other compounds present to form compounds that can condense on cooler downstream surfaces to form deposits.

Another significant fraction of pyrolysis vapors are oligomers (monomers, dimers, trimers & tetramers) of biopolymers, notably lignin. Non-monomer biomass polymeric fragments are depositable tars because of the high boiling points of these compounds. Trimers and tetramers would generally tend to have higher boiling points than monomers and dimers. It should be noted that these primary tar polymeric fragments are, at least initially, not polyaromatic hydrocarbons (PAH) typical of secondary and tertiary tars. Polyaromatic hydrocarbons containing fused aromatic rings are not naturally present in biopolymers and are formed during high temperature processing. High molecular weight heterocyclic and PAH compounds can be considered to be depositable tars because of high dew points.

It is generally understood that, at and above the pyrolysis temperature, the biopolymer derived oligomers can exist as vapor or aerosols within the pyrolysis gas stream [Lede, J., Diebold, J P., Peacocke, G. V. C, Piskoriz, J., *"The Nature And Properties Of Intermediate And Unvaporised Biomass Pyrolysis Materials"*, p 51-65 in Bridgwater, A., Czernik, S., Diebold, J., Meier, D., Oasmaa, A., Peacocke, C., Piskorz, J., and Radlein, D. editors, *Fast Pyrolysis of Biomass: A Handbook*, CPL Press, Newbury, UK, 1999] which is incorporated by reference.

Boroson et al observed that char and some minor inorganic components within lignocellulosic feed stocks were catalytic to the formation of char [Boroson, M, Howard, J., Longwell, J, and Peters, W, *"Heterogeneous Cracking of Wood Pyrolysis Tars over Fresh Wood Char Surfaces"*, Energy & Fuels, 1989, 3, pp 735-740]. Morf et al also observed that biomass char was catalytic to the formation of secondary & tertiary tars from primary tars [Morf P., Haslerb, P. and Nussbaumerb, T., *"Mechanisms and kinetics of homogeneous secondary reactions of tar from continuous pyrolysis of wood chips"*, Fuel, 81, (7), May 2002, pp 843-853]. Both are included by reference. Morf et al observed higher levels of secondary and tertiary tars as indicated by the increased concentration of naphthalene (a PAH) with or without char present at temperatures exceeding 650° C.

The observations of Boroson et al and Morf et al infer that deposits formed may be catalytic to the formation of more 'deposit' especially if char particles entrained in the pyrolysis vapors are captured on the surface of a deposit.

Methods of Tar Reduction

General approaches used to reduce tars (and thus depositable tars) in biomass gasifier output streams including:
- cool the gasifier output gas and use conventional gas scrubbing means to effect tar removal;
- increase the operating/outlet temperature of the gasifier to enhance thermal destruction in the presence of oxidative gases (such as steam, oxygen or carbon dioxide);
- increase the temperature of the outlet gas from the gasifier to enhance thermal destruction in the presence of oxidative gases (such as steam, oxygen or carbon dioxide);
- employ heterogeneous catalysts for residual tar destruction in the presence of oxidative gases (such as steam, oxygen or carbon dioxide);
- condense tars without forming deposits within the system.

One method for tar reduction is to remove tars after cooling the gas stream. In practice, fine aerosols have proven to be difficult to remove and often an electrostatic precipitator is required in addition to conventional aqueous scrubber systems operating near ambient temperature. This approach does not mitigate problems of deposit formation on cooler system surfaces or gas cooling heat exchanger surfaces. In addition, aqueous scrubbers create waste streams for treatment and disposal.

Examples of the thermal tar destruction approach by raising the output gas temperature and increase residence time were disclosed by Graham and Barynin, in U.S. Patent Application 20040107638 and also Cordell and Gailer in U.S. Pat. No. 6,120,567 in which a controlled quantity of air is introduced into a secondary chamber to reduce tar concentrations, particularly depositable tar aerosols. Gas temperatures well in excess of 750° C., and often in excess of 1000° C., are required for tar destruction. The teachings of Elliot, Boroson and Morf would tend to infer that temperatures exceeding 750° C. would result in the conversion of any remaining tars to undesirable bi- and poly-cyclic PAH compounds.

Oxygen blown, entrained flow gasifiers can operate with maximum temperatures exceeding 1200° C. which is sufficient to destroy virtually all tars prior to exiting the gasifier. A significant disadvantage with thermal tar destruction (by raising the temperature of the gasifier or heating gasifier outlet gas) is a loss of system thermal efficiency.

Norbeck and Hacket disclosed in U.S. Patent Application 20080312348 a tar reduction method in a hydrogen+steam hydrogasification process. Examples disclosed 5 and 25 second conversion times within a steam hydrogasification fluidized bed at 750° C.-850° C. and 180 psi. This process was non-catalytic and examples indicated 750° C. or 850° C. and 25 second residence time was required to achieve tar levels of <1%. The nature of the tars were not reported, however, based on the teachings of Elliot, Boroson and Morf, it is surmised that these temperatures would result in the formation of undesirable bi- and poly-cyclic PAH compounds which would tend to be 'depositable tars'.

Catalysts have been used in a secondary bed in series with the gasifier for the destruction of tars contained in the synthesis gas or producer gas by oxidation or reaction with hydrogen or steam within the synthesis gas. A recent review of published information on catalytic tar reduction was performed by Gerber and is incorporated here by reference [Gerber, M A., "*Review of Novel Catalysts for Biomass Tar Cracking and Methane Reforming*", PNNL-16950, October 2007].

Mudge et al disclosed in U.S. Pat. No. 4,865,625 (Mudge-625) the use of a catalytic secondary reactor in which air, oxygen and/or steam was injected in a secondary bed to effect tar destruction over supported nickel and other catalysts operating from about 550° C. to 750° C. In the Mudge-625 patent, it was disclosed that producer gas (containing <10% $CH_4$) was produced by oxidative steam gasification in a first bed at about 600° C. to about 800° C. and catalytically treated in a second bed at temperatures as low as 500° C. to 600° C. for tar destruction. Injections of air, oxygen or hot steam into the second bed resulted in tar destruction and acceptable levels of coke produced on the catalyst. In this process, the majority of tars were reacted to form synthesis gas or producer gas in the gasifier prior to entry into the secondary reactor. This approach is not suitable for the reaction of tars produced by pyrolysis without gasification. This is indicated by the failure of catalysts placed in the gasifier (which would expose catalyst to pyrolysis vapors prior to being thermally reacted to form primarily synthesis gas or producer gas).

Of special concern noted in this approach was catalyst deactivation due to the formation of coke in the catalyst which was greatly reduced by the placement of the nickel based catalysts in the secondary reactor rather than the first (steam gasifying) reactor. It was noted by Baker et al the importance of maintaining a minimum steam/biomass ratio and maintaining the secondary catalytic bed at elevated temperature to achieve tar reduction and coke re-gasification to combat catalyst deactivation [Baker, E. G., Brown, M D., Elliott, D. C., Mudge, L. K. "*Characterization And Treatment Of Tars From Biomass Gasifiers*". PNL-SA-16148; CONF-880850-19, August 1988] which is incorporated by reference. A minimum operating temperature of 600° C. was noted by Baker et al as well as the preference for fluid bed versus fixed bed. [Baker, E., Mudge, L. and Brown, M D., "*Steam Gasification of Biomass with Nickel Secondary Catalysts*", Ind. Eng. Chem. Res., 1987, 26, pp 1335-1339] which is incorporated by reference.

Simell and Kurkela disclose in U.S. Pat. No. 7,455,705 (Simell-705) a method for tar and ammonia destruction of gasifier output gas using a zirconia catalyst in a secondary catalyst bed when combined with oxygen containing gas additions and operating at a temperature of 500° C. to 900° C.

Ekstrom et al disclosed in U.S. Pat. No. 5,213,587 (Ekstrom-587) the use of a secondary fluidized bed containing a catalyst (and absorbent) of magnesium-calcium carbonate and calcined magnesium-calcium carbonate (and mixtures) to affect the destruction of tars, ammonia, etc from a gasifier output stream with an operating temperature of the secondary stage maintained at between about 600° C. and about 1000° C., preferably 700° C.-900° C. Oxygen is added to maintain bed temperature by partial combustion. It is generally known in the art that alkali earth and alkali carbonates (and their corresponding oxides) catalyze biomass pyrolysis and gasification reactions.

The Mudge-625, Simell-705 and Ekstrom-587 processes utilize catalysts to enhance the destruction of residual levels of tars contained in biomass gasifier output streams (synthesis gas or producer gas) and require the addition of oxygen or steam to oxidize residual tars and/or maintain temperatures well in excess of 600° C., preferably in excess of 700° C. The experience noted in Mudge-625 and subsequent publications clearly indicate that the 'secondary bed with oxygen or steam additions approach' is not suitable for pyrolysis vapor streams.

Approaches have been disclosed to condense depositable tars on solid media. Brandi et al disclosed in U.S. Pat. No. 4,936,872 the gasifier product gas cooled in a fluidized bed with solid particles removed from the fluidized bed and later returned into the reactor. Rasanen and Pohja disclosed in U.S. Pat. No. 5,562,744 a method and reactor which allow process gas obtained in gasification to be cleaned and cooled using solid media. Incorporation of a solid media gasification catalyst was disclosed and recycle of media to the fluid bed. Finnish Patent 76 834 and Finnish Patent Application 910 731 disclose methods for removing depositable tars from a gasifier output stream by cooling in a fluidized bed reactor to deposit tar and other compounds onto a solid material placed in a secondary reactor before they reach the cooling surfaces of the reactor. This 'depositable tar condensation on solid media' approach requires additional complex heat transfer systems for the cooling of solid media and the removal of deposited tars from the media.

Approaches have been disclosed to remove depositable tars by condensation with organic liquids above the condensation temperature of water. Holter et al disclose in U.S. Pat. No. 4,206,186 a two stage process of cooling and tar removal from gasifier output gas streams by cooling to about 600° C. then using a re-circulating oil wash while maintaining the temperature of the gas stream above the dew point of water.

Boerrigter and Bergmann in U.S. Patent Application 20040220285 disclosed the application of oil wash for tar removal from biomass derived synthesis gas at 600° C.-1300° C. This process is also described in several research reports including [Boerrigter, H, van Paasen, S., Bergman, P., Könemann, J, Emmen, R., Wijnands, A "*OLGA Tar Removal Technology Proof-of-Concept (PoC) for application in integrated biomass gasification combined heat and power (CHP) systems*", Report No. ECN-C-05-009, January, 2005] which is incorporated by reference.

The 'depositable tar condensation with organic liquid' approaches allow for the use of conventional heat recovery systems, however, produces an organic stream contaminated with depositable tars requiring continuous replenishment or recovery and purification of the organic liquid.

It is generally known that the propensity of any vapor phase chemical compound in a gas stream to condense on a cooler surface is directly related to its dew point. The dew point is related to the boiling point of the compound and its concentration in the gas stream. This is somewhat complicated by the tendency of similar compounds to interact and selectively partition between vapor and liquid phases especially for high molecular weight compounds of similar chemical makeup such as oligomers, tetramers and polymers with a range of molecular weights. However complicated, it is a necessary condition for vapor phase components to condense to a liquid or solid phase in order to form a deposit within process hardware. Aerosols are essentially liquid phase droplets suspended in the gas stream.

The situation is further complicated by chemical reactions which result in higher molecular weight compounds being formed (via dehydrogenation, cracking, condensation or re-polymerization reactions). These reactions can be catalyzed by surfaces (or deposits on surfaces). As noted previously, it is generally known that char is catalytic to the formation of more char from biomass pyrolysis vapors.

However, tar vapors that simply condense to form low viscosity liquids do not form deposits. Exceptions can occur if condensed liquid tars interact with other compounds, particulates or aerosols present in the gas stream. The interactions may be physical or chemical, such as by binding of char particles in order to adhere to a surface or by chemical reaction to increase molecular weight.

Biomass Fast (or Flash) Pyrolysis:

The three primary bio-polymer components of biomass are cellulose, hemi-cellulose and lignin. It is generally known that these will thermally decompose in the absence of oxygen to form gaseous or liquid intermediate oxygenated compounds plus carbonaceous char upon heating over temperature ranges depending on the biopolymer type. This thermally induced self-decomposition is typically referred to as pyrolysis as opposed to gasification.

It is generally known that the rate of heating is important to the proportion and composition of the gas phase formed upon decomposition. Generally, flash pyrolysis is considered to require <0.1 second to heat the biomass particle to above the pyrolysis temperature and remove the pyrolysis gas from the reactor. Fast pyrolysis is considered to require about 0.1 to about 5 seconds while slow pyrolysis of biomass is considered to occur over about 30 seconds with rapid pyrolysis in between. Flash, fast, rapid and slow pyrolysis produce pyrolysis (vapor+gas) gas streams which are high in tars but differ in amounts and chemical makeup.

A review of biomass fast pyrolysis was published by Bridgwater et al [Bridgwater, A., Czernik, S., Diebold, J. Meier, D., Oasmaa, A., Peacocke, C., Piskoriz, J., and Radlein, D., *Fast pyrolysis of Biomass: A Handbook*, CPL Scientific Publishing, UK, 1999] and in a later review by Bridgwater [Bridgwater, A., "*Biomass Fast Pyrolysis*", *Thermal Science: Vol. 8* (2004), No. 2, pp. 21-49]. Both are incorporated by reference.

Both fast and flash pyrolysis maximize pyrolysis vapor (tar plus light gas compounds) generation and minimize char formation. The carbon content of the pyrolysis gas/vapor is maximized with faster pyrolysis rates and this is generally desirable when producing a fuel from the gas/vapor stream. The speed of pyrolysis strongly affects the solid char formation rate with char formation is generally understood to be inversely related to speed of pyrolysis:

Char formation: Flash<Fast<Rapid<Slow

Biomass Hydro-Gasification Process:

In U.S. Pat. No. 4,822,935, (Scott-935) Scott disclosed a process performing the hydro-gasification of biomass which was accomplished at atmospheric pressure and low temperature conditions far less severe than required for coal and similar feed stocks. The Scott-935 process is a combined fast pyrolysis and hydro-gasification process within the same reactor.

The Scott-935 process consisted of rapid pyrolysis of solid biomass particles fed to a near-atmospheric pressure fluidized bed containing supported catalyst particles in the presence of flowing hydrogen. The catalyst, typically nickel supported on alumina, was found to react biomass with flowing hydrogen gas to form methane and steam with minor proportions of CO, $CO_2$, char and 'tars'. Importantly, the reaction to form methane was observed to occur at temperatures of 450° C. to 650° C. and preferably 500° C.-550° C. Fluidizing gas (hydrogen) was pre-heated but not above the temperature of the fluidized bed. Hydrogen gas containing entrained wood particles was not pre-heated. A 'cooling finger' was incorporated within the fluidized reaction bed to avoid pre-heating of the wood particle and hydrogen feed stream.

The Scott-935 process temperature range is well below typical gasification temperatures required for synthesis gas or producer gas and is within the range of temperatures used for the pyrolysis of biomass for the production of bio-oil. Also of importance, this was performed without the addition of oxygen or air to provide heat by combustion or partial oxidation within the fluidized bed. Reported gas contact times were typically less than 2 seconds and preferably 0.4 to 0.8 seconds. Scott-935 disclosed a gas residence time of less than 5 seconds, preferably less than 2 seconds and most preferably less than 1 second in the fluidized bed catalytic reactor.

Scott-935 disclosed that low but significant levels of 'tar' and 'char' were produced; however, the levels of 'tar' are still above levels required for commercial use. The lowest levels of 'tar' disclosed ranged from 0.4 wt % to ~1 wt % but typically 5 wt % to 15 wt %. The nature of the 'tar' produced was not disclosed except that it condensed upon cooling to near ambient temperature.

All reported trials were performed at or near atmospheric pressure with the preferred temperature range being 500° C. to 550° C. Operation below 500° C. trended towards increased tar and char formation and decreased methane formation. Operation above 550° C. trended towards decreased char and methane formation with increased carbon oxide formation. Tar and char formation rates were strong functions of the Wood Feed Rate/Catalyst ratio (F/C ratio) with an optimum F/C ratio being observed.

The formation of coke on the nickel catalyst was noted by Garg et al but did not appear to deactivate the catalyst (in 30 minute runs) [Garg, M, Piskorz, J., Scott, D. S. and Radlein, D., "*The Hydrogasification of Wood*", *Ind. Eng. Chem. Res.* 1988, 27, pp 256-264] which is incorporated by reference. Catalyst coke levels of less than about 3 wt % did not appear to inhibit the methane formation reaction.

The observations of Mudge et al noted that a similar a nickel catalyst was deactivated in a steam fluid bed gasifier within a few hours [Baker, E., Mudge, L. and Brown, M D., "*Steam Gasification of Biomass with Nickel Secondary Catalysts*", *Ind. Eng. Chem. Res.,* 1987, 26, pp 1335-1339] Mudge-625 disclosed that carbon on the catalyst in a secondary catalyst bed could be controlled by oxidation with oxygen or gasification with steam.

The impact of performing hydropyrolysis of a biomass feed at elevated hydrogen pressure (over the range 300° C. to 700° C. and up to 70 bar) was studied by Guell et al who noted bio-oil yields decreased by relatively small amounts over the pressure range in a well swept reactor and heating rates of about 1000° K/sec [Guell, A., Li, C. Z, Herod, A., Stokes, B., Hancock, P. and Kandiyot, R., "*Effect Of H2-Pressure On The Structures Of Bio-oils From The Mild Hydropyrolysis Of Biomass*", Biomass and Bioenergy, 5, 2, pp. 155-171, 1993] which is incorporated by reference. High total volatiles yield was noted (bio-oil plus gases) for wood pyrolysis at 400° C. to 500° C. and up to about 40 bar. A slight decrease in yield was noted at 70 bar. This would indicate that non-catalytic treatment of pyrolysis vapors with pressurized hydrogen gas alone does not produce synthesis nor producer gas.

There is a clear need for a process which converts biomass into a useful fuel which avoids the formation of deposits downstream of thermochemical reactors.

SUMMARY

The method disclosed here describes a hydro-gasification process in which lignocellulosic biomass is converted into methane and light hydrocarbons in a low-temperature, non-oxidative, thermochemical process operating with a hydrogen rich atmosphere at moderate pressure. The disclosed method reduces depositable tars without the addition of oxidative gases or superheated steam. In this disclosure, low-temperature means above about 400° C. and below about 650° C. Moderate pressure in this disclosure means above about 2 atm to about 50 atm.

The disclosed method uses sequential steps of low-temperature biomass fast pyrolysis (or flash pyrolysis) followed by low-temperature catalysis under moderate hydrogen pressure to produce a methane, steam and hydrocarbon rich stream. An extended gas residence time within a catalyst bed downstream of the primary methane formation zone is utilized is to achieve low depositable tars in the methane-rich output stream prior to gas cooling.

The disclosed method preferentially uses a supported catalyst with methane forming activity and a support material with tar (light oxygenate) cracking activity and preferably also with coke re-gasification activity.

The fast (or flash) hydropyrolysis reaction preferentially uses a hydrogen rich sweep gas. The hydropyrolysis reaction may optionally also be catalytically enhanced to increase the quantity of pyrolysis gas generated and to reduce the char generated. A series of embodiments is envisaged which incorporate a variety of pyrolysis reactor configurations as options.

The methane forming catalytic reactors are preferentially of a moving bed type with slow recirculation of catalyst particles from the end of the extended time exposure bed section to the methane forming section of the bed. A series of embodiments are envisaged which incorporate a variety of catalyst bed configurations as options.

The disclosed method is a significant departure from a biomass gasification process producing synthesis gas or producer gas related to gasification processes using added oxygen (as air or oxygen). Generally, the teachings of oxidative gasification are not applicable to non-oxidative gasification despite similarity of process stages because operating temperatures are required well in excess of 650° C. to achieve reduced depositable tar levels in the gasifier outlet stream. The output of gasifiers is synthesis gas or producer gas. Contrary to other processes, air or oxygen is not used to partially combust biomass or pyrolysis products in order to provide heat to the secondary catalyst bed.

The disclosed method addresses deficiencies in prior art biomass hydrogasification so that 'depositable tars' are reduced to low levels despite operation at low temperatures. The method disclosed also addresses several deficiencies of the single stage hydrogasification process including the direct contact of biomass ash and char with methane forming catalyst.

The foregoing and other objects, features, and advantages of the invention will become more apparent from the following detailed description, which proceeds with reference to the accompanying figures.

BRIEF DESCRIPTION OF THE DRAWINGS

FIG. 2 is graph illustrating calculated equilibrium light gas concentration as a function of temperature and concentration.

FIG. 5 is a graph illustrating methane, char and tar formation as a function of $H_2$ pressure.

DETAILED DESCRIPTION

In the disclosed method, the separation of biomass pyrolysis and catalytic reaction steps allows the operation of each step at different operating temperatures, gas velocities and residence times. Catalyst operation at moderately elevated pressure greatly assists in achieving an extended residence time in the secondary catalytic reactor to reduce oligomeric tars to acceptable levels. Catalyst operation at temperatures elevated from the pyrolysis step is achieved by thermally coupled oxygenate cracking and methane formation reactions with a net exothermic reaction heat produced in the methane forming section of the catalyst bed. Flowing gas exiting the primary methane forming region within the reactor maintains downstream sections of the catalyst bed(s) at elevated temperatures. Moderately elevated temperature above the pyrolysis temperature in the catalytic reactor assists in reducing depositable tars to acceptable levels. Extending the exposure time of the gas stream at elevated temperatures assists in reducing the aerosol content of the gas stream and further chemical degradation by the catalyst present reduces re-polymerization reactions.

In this disclosure, "pyrolysis gas" is intended to mean a mixture of biomass pyrolysis vapors, aerosols and a hydrogen-rich gas where the pyrolysis vapors are produced by fast or flash pyrolysis of biomass. Biomass includes feedstocks such as wood, straw, etc. Pyrolysis gas may or may not include entrained char or ash particles and preferentially does not. Pyrolysis vapors include condensable and non-condensable hydrocarbons, oxygenated hydrocarbons, aerosols, steam and carbon oxides.

Figure 1:
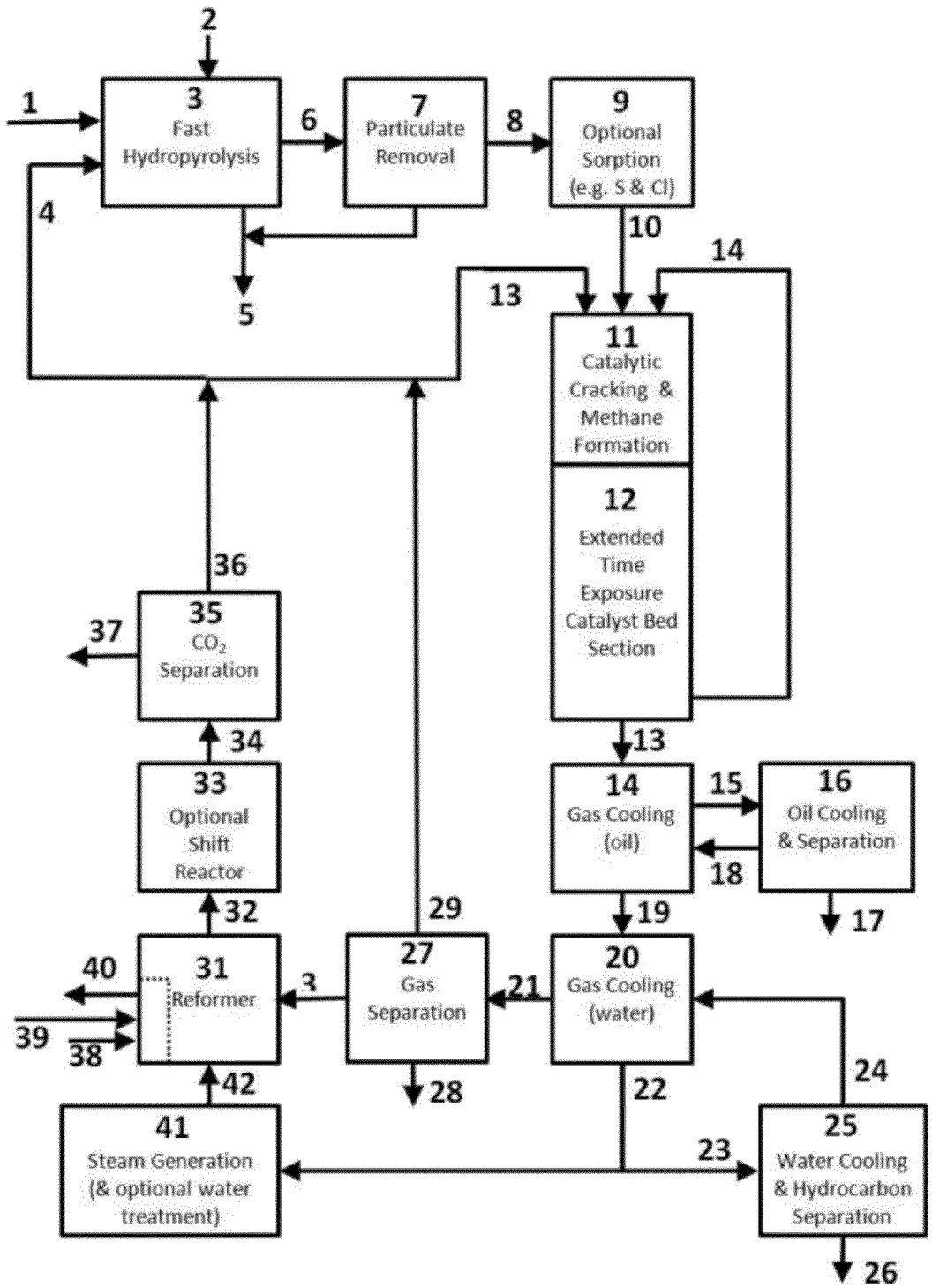
FIG. 1 is a schematic flow chart illustrating an embodiment of the present invention.
Figure 1A:
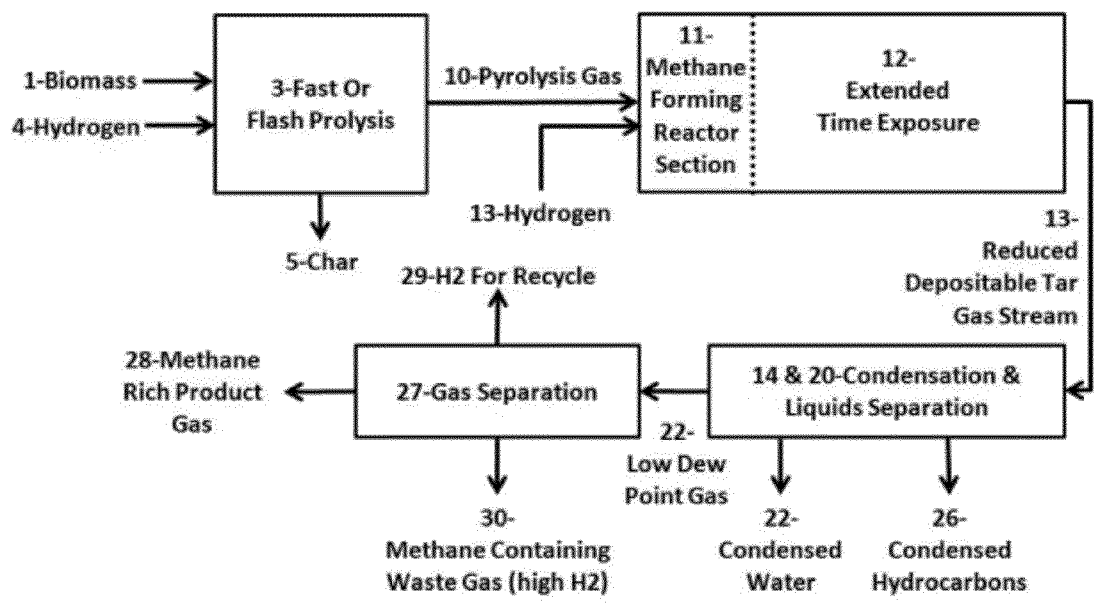
FIG. 1A is a schematic flow chart illustrating an embodiment of the present invention.

In a preferred process embodiment depicted as FIG. 1, the biomass (1) with a water content of about 5 wt % to about 25 wt % is fed to a hydropyrolysis reactor (3) with a source of heat for pyrolysis (2). The required hydropyrolysis heat can optionally be supplied to the hydropyrolysis reactor by superheated hydrogen-rich gas, direct heat exchange, hot solid media or other means. A simplified version of FIG. 1 is depicted as FIG. 1A showing only key process elements.

Hydropyrolysis is used to thermally decompose biomass to a pyrolysis vapor (6) containing non-condensable gas, vapors and aerosols plus a solid char by-product (5). The pressurized hydropyrolysis reactor (3) is operated at temperatures of about 400° C. to about 550° C. Hydropyrolysis is preferentially performed above about 450° C. to achieve acceptable pyrolysis gas formation rates. Operation at temperatures in the lower part of this range tends to increase char yield. Fast pyrolysis methods known in the art include auger, ablative, rotating cone, fluidized beds and circulating fluidized beds.

Low gas-char contact times are easily achieved in fluidized bed fast pyrolysis reactors. In preferred embodiments for non-fluidized bed fast pyrolysis methods, a sweep gas is preferentially used to assist the removal of the pyrolysis products from the fast pyrolysis device. It is desirable to maximize char residence times to induce greater evolution of gases.

Pyrolysis at elevated pressure reduces superficial gas velocities for the removal of pyrolysis products from the hydropyrolysis reactor and the use of a sweep gas (4) is preferred. Hydrogen or hydrogen plus steam (with or without CO or $CO_2$) is preferentially used as a sweep gas (4).

It is required to minimize the contact time of pyrolysis gas or vapor with char present in the pyrolysis reactor. Pyrolysis gas/char contact times are preferably less than 10 seconds, more preferably less than 2 seconds and most preferably less than 1 second. Fast (or flash) pyrolysis systems are known in the art which are suitable for adaptation to pressurized operation with hydrogen and the incorporation of a sweep gas (4) as required to maintain the desired pyrolysis gas/char contact times.

The hydropyrolysis reaction may optionally also be catalytically enhanced to increase the quantity of pyrolysis gas generated and to reduce the char generated. Optional methods include the mixing of finely divided pyrolysis or gasification reaction enhancing materials with the biomass feedstock and the use of catalytic or catalyst coated media within the pyrolysis reactor.

The operation of both the fast hydropyrolysis (3) and methane forming catalytic reactors (7 & 9) at low temperatures and mildly elevated hydrogen gas pressure minimizes the formation of PAH type 'depositable tars' derived from aromatic ring containing compounds within the pyrolysis gas. Solid residence times within the hydropyrolysis reactor may be extended so as to minimize the yield of char. Char and ash (5) are discharged from the hydropyrolysis reactor (3) and particulate removal (7) steps.

The pyrolysis gas (6) exiting the pyrolysis reactor contains the products of the thermal decomposition of the biopolymers within the biomass and other organic compounds within the biomass (oils, tri-glycerides, etc.) plus water and sweep gas. Aerosols are also typically present. Entrained char and ash are subsequently removed by cyclone or hot filter particulate removal (7). It is known that filtration does not reduce the aerosol content of pyrolysis gas.

Optional intermediate treatments also include chlorine or sulfur sorption (9). Preferably, the sorbent material is non-catalytic to the cracking of oxygenated compounds contained in the gas mixture. Appropriate materials known in the art include zinc oxide, alkali earth oxides, hydroxides or carbonates and related silica containing mineral compounds.

The filtered and treated pyrolysis gas (10) contains a high concentration of gravimetric tars, including low molecular weight oxygenate hydrocarbons as vapors and high molecular weight oxygenated hydrocarbons as vapors or aerosols. The temperature of this stream (10) is approximately the same as the pyrolysis reactor (most preferably between about 450° C. and about 500° C.) and is above its dew point. Active heat exchange (not shown) is optionally used to control the inlet temperature to the secondary reactor (11).

The filtered and treated pyrolysis gas (10) is catalytically reacted in a secondary reactor (11) with excess hydrogen gas (13) to preferentially form methane (and light hydrocarbons) while operating below about 650° C., preferably below about 600° C. and most preferably about 550° C. The higher operating temperature of the catalytic reactor (11) is achieved without the addition of air, oxygen or superheated steam or by other means of external heating (except to overcome external heat losses). The exothermic catalytic reaction to form methane is thermally coupled with cracking reactions of compounds within the pyrolysis gas. Excess reaction heat causes the temperature of the gas stream to increase in the zone where most methane is formed and also transport heat downstream of this zone.

Without being bound by any theory, in the first section of the catalytic bed (11), endothermic cracking reactions of light oxygenates are thermally coupled with exothermic methane formation reactions. A net excess of exothermic reaction heat results in a temperature rise above the pyrolysis temperature. The term 'thermally coupled' is defined here to mean that exothermic reaction heat is released locally by one reaction and is available to supply reaction heat for a second endothermic reaction which also occurs within a short proximity.

An 'extended gas residence time' section in the catalyst bed (12) following the main 'methane forming section' is provided to reduce residual depositable tars. The decomposition rate of residual biopolymer oligomeric tars existing as vapors or aerosols is enhanced at the elevated temperature above the pyrolysis temperature. Extending the gas contact time assists in further decomposition of depositable tars. The oligomeric tars and slow reacting chemical species downstream of the main methane formation section (11) is exposed to catalyst, steam, methane, hydrocarbons and excess hydrogen (plus minor levels of carbon oxides) a temperature elevated above the pyrolysis temperature. H/C and O/C ratios are about same as the methanation section input ratios.

Aerosols are difficult to deal using a solid-gas heterogeneous catalytic bed. It would be expected that a portion of the larger diameter (lignin derived) aerosols may impact and adhere to catalyst particle exterior surfaces. As such, it is desirable to maintain low gas velocities within the catalyst bed to minimize momentum impacts. Small diameter aerosols would tend to be maintained as entrained aerosols and tend to decompose faster because of higher surface area (exposure to hot steam and hydrogen gas). Once the liquid phase oligomers within aerosol particles de-polymerize to form vapors, the vapors can diffuse into the catalyst particles for reaction. The operation of both the fast hydropyrolysis reactor (3) and catalytic reactors (11,12) at mild temperatures and mildly elevated hydrogen gas pressure reduces the formation of naphthalenic and PAH type 'depositable tars' from aromatic ring containing precursors. Naphthalenic and PAH type depositable tars are not native to biomass and, once formed, are difficult to decompose and require severe process conditions to achieve their destruction.

Some catalyst cooling can be tolerated downstream of the 'thermally coupled' section of the catalyst bed. Downstream cooling can result from the approach to equilibrium of the light gases (equations 2 to 7), continuing decomposition reactions of oligomers and thermal losses.

Optionally, a third reactor can be utilized using a different catalyst from that used in the methanation reactor (not shown in FIG. 1). Optionally, the catalyst in the optional third reactor can be utilised to selectively promote the hydrodeoxygenation (HDO) of substituted oxygenated aromatic compounds (such as substituted phenols) but limit ring-opening reactions so as to enhance the formation of light mono-aromatic compounds versus additional methane. Mono-aromatic phenolic compounds are considered to be non-depositable tars. However, there is commercial benefit to de-oxygenating these compounds to substituted aromatic compounds such as benzene, toluene, ethyl benzene, xylene (BTEX) and other substituted aromatic hydrocarbons. If sufficient mono-aromatic phenol compounds are present, it is a preferred option to add a separate catalytic reactor downstream of the two-section methanation reactor to preferentially hydro-deoxygenate (HDO) the mono-aromatic phenolic compounds with catalysts that have limited 'ring opening' activity so as to maintain the aromatic ring structure after deoxygenation. Catalysts and operating temperatures for HDO are generally known in the art.

In a preferred embodiment, a moving bed in the catalytic reactor so that catalyst particles are removed from the end of the bed (14) and returned to the inlet. In this manner, coke formed within the catalyst by some of the oxygenate cracking reactions in the first section of the bed (where cracking and methane formation reactions preferentially occur) is effectively moved to the 'extended time exposure' section of the bed. Slow moving beds are a most preferred configuration with catalyst being removed from the extended time exposure bed section exit and re-circulated to the methanation bed section inlet either by mechanical means or by gas entrainment. Gas flows are preferably co-current but are optionally counter-current to catalyst movement within either of the two catalyst bed sections.

Another preferred option is to use a circulating fluidized bed with a fluidized bed as the methane forming section which overflows catalyst into a slow moving second stage moving bed. Catalyst is returned to the fluidized bed after extended time exposure in the second stage.

Another preferred option is a riser reactor configuration.

Fluidized beds and riser reactors require very attrition resistant catalyst particles and are generally not as appropriate for very long gas residence times.

In a preferred embodiment, the gas output from the catalytic reactor(s) is primarily composed of steam, methane and excess hydrogen with lower levels of $CO_2$, CO and other gases. The gas output from the catalytic reactor(s) preferably contains levels of depositable tars with a dew point of less than the operating temperature of the cooling stage (14) following the reactor (12).

In a preferred embodiment, the gas output from the catalytic reactor(s) (13) is preferentially cooled in a stepwise fashion using sequential gas cooling towers containing oil (14) and water (20). Compounds with boiling points above and near the operating temperature of the oil cooling tower (14) are preferentially condensed along with residual heavier oxygenated 'tar' compounds. The oil (15) is cooled and recycled to the tower (18). A fraction of the oil is removed from the recycle line where products and contaminants/byproducts (17) are separated from the oil by conventional processes (16) (such as atmospheric pressure distillation) and the oil returned to the oil tower cooling system. The cooling oil is preferably a paraffinic mineral oil with a normal boiling point range of about 200° C. to about 500° C. It is preferred that the low boiling fraction of the oil be removed prior to use so as to minimize vapor carryover to the water cooling section. The outlet gas (19) temperature from the oil cooling step is maintained above the condensation temperature of water under process conditions to minimise water condensation within the oil cooling step.

In a preferred embodiment, the bulk of the water contained in the gas output from the catalytic reactor(s) is condensed in a water cooling step (20). Low boiling point hydrocarbons, light oxygenates and water are preferentially condensed in the water condensing tower along with residual water soluble compounds. A portion of the water is chilled (23) and treated (24) for recovery of light hydrocarbons (26) and depressurized for $CO_2$ separation (24). Cooled water is recycled to the cooling tower (24). Other water soluble contaminants are optionally separated from the water by known boiler feed water treatment processes prior to being re-heated (41) and used as steam feed (42) to the reformer (31).

Modeled mass balances indicate that a minimum initial biomass moisture content of about 7% plus water produced in the methane formation reaction is required as feed to the reformer to generate hydrogen needed by the process. This minimizes waste water discharges and reduces disposal costs.

A single water cooling step can optionally be used in lieu of oil cooling plus water cooling steps.

In a preferred embodiment, the output gas from the water cooling step (21) is preferentially near ambient temperature and is primarily a water-saturated, impure methane and hydrogen stream at near system pressure. Optionally, this gas is further conditioned for low levels of CO and $CO_2$ and trace $H_2S$, ammonia, alkali and chlorides by conventional means such as activated carbon bed, ZnO bed, alkali water scrubber, etc.

In a preferred embodiment, the pressurized and cooled impure methane (+hydrogen+water+CO) gas stream (21) is desirably separated to produce a hydrogen-rich stream (29) for recycle to the process, a high-purity methane product stream (28) and a methane-rich waste gas stream (30).

In a preferred embodiment, the separation process (27) for the output gas from the water cooling step is a two-stage pressure swing adsorption (PSA) system. The PSA system produces impure hydrogen as a high pressure product for recycle to the process and a high-purity methane stream preferably as pipeline-grade methane. Optionally, the high purity methane stream can contain minor amounts of hydrogen which is subsequently removed to produce a 'pipeline grade' methane stream by known means such as a selective hydrogen permeable membrane device.

In a preferred embodiment, the low-pressure PSA exhaust containing impure methane (30) is preferentially re-pressurized and steam reformed (31) to make at least a fraction of the hydrogen needed in the process. Optionally, the PSA exhaust gas (30) is further conditioned prior to input to the steam reformer (31) for removal of trace $H_2S$, alkali, ammonia and chloride compounds by conventional means such as activated carbon bed, ZnO bed, alkali water scrubber, etc.

In a preferred embodiment, the methane-rich waste gas stream (30) is re-pressurized as required and preferentially fed to a steam reformer (31) to produce hydrogen required for the process (36). Steam produced from treated condensate water (42) is preferentially used for steam reforming. Light hydrocarbons condensed in the water condensation step are optionally removed as a by-product (26). Reformer heat requirements are preferentially supplied by combustion of the char by-product from fast-hydropyrolysis (5,38) with air (39) producing a $CO_2$ containing flue gas (40). Reformer reactant pre-heating is preferably performed by heat exchange with process cooling steps.

In a preferred embodiment, the low-pressure PSA exhaust containing impure $CO_2$ (37) and hydropyrolysis char (5) are optionally combusted with air (39) and the heat used in a steam reformer to make at least a fraction of the hydrogen (4,13) needed for the production of methane in the process.

In a preferred embodiment, the hydropyrolysis char (5) is optionally gasified to make at least a fraction of the hydrogen (4,13) needed for the production of methane in the process.

It is known that the fast pyrolysis of lignocellulosic biomass produces a wide range of chemical compounds in both vapor and aerosol forms. Several published studies on the composition of bio-oil (condensed from pyrolysis vapor) plus direct measurement of pyrolysis vapors indicate well over 200 chemical species present. A significant fraction cannot be analyzed by gas chromatograph (GC) analysis. The high molecular weight fraction with molecular weights in excess of 1000 Daltons are present in proportions which can form deposits within processing systems. Those compounds with boiling points above ambient temperature (excluding water) are generally referred to as tars.

Without being bound by any theory, deposits are formed by four mechanisms: condensation of high boiling point compounds on cooler surfaces; impingement of liquid phase aerosols onto surfaces and adhesion to the surface; the impingement of entrained char particles onto surfaces already fouled with deposit (liquid enhanced adhesion); and deposit forming chemical reactions catalyzed by char adhering to an existing deposit.

In addition, chemical reactions can occur in the vapor phase to give reaction products with increased molecular weight and increased condensation temperature or dew point. Condensation and re-polymerizations type reactions are of particular concern. These types of reactions are enhanced by lower temperature and the presence of free radicals in the vapor phase.

It is clear that all significant mechanisms of deposit formation must be mitigated.

It is disclosed that a series of conditions are required to reduce deposit formation within thermochemical biomass conversion processes. These conditions include:

- Operation with elevated hydrogen partial pressure and excess hydrogen;
- Reaction of pyrolysis gas to preferentially form methane and the exposure of process gas containing residual high molecular weight compounds (including biopolymer fragments as aerosols) to temperatures elevated above the pyrolysis temperature to enhance thermal depolymerization and destruction;
- Extended time of exposure to enhance the thermal destruction of residual high molecular weight compounds (including biopolymer fragments as aerosols) originally present in the pyrolysis gas;
- Perform the thermal destruction of residual biopolymer fragments in the presence of a suitable catalyst to convert monomer or dimer fragments to non-polymerizable chemical species;
- Operation below about 650° C. to avoid the formation of PAH compounds;
- The chemical conversion of the majority of compounds in pyrolysis vapor to less reactive methane;
- Operation of catalyst outside the thermodynamically defined coke stability region.

Methods of satisfying this series of conditions are disclosed here. Without being bound by any theory, these methods are discussed in the following paragraphs with postulated reasoning or evidence to support the particular aspect of the method disclosed. However, it should be recognized that it is the combination of this series of necessary conditions that is the novel aspect of this disclosed invention.

Process operation under elevated hydrogen partial pressure is beneficial. Excess hydrogen at elevated pressure is generally known to inhibit dehydrogenation reactions plus enhance hydrogenation and hydrodeoxygenation reactions.

During biomass pyrolysis with hydrogen gas, Guell et al noted bio-oil yields decreased by only small amounts over the 1 to 70 barg pressure range in a well swept reactor and heating rates of about 1000° K/sec [Guell, A., Li, C. Z., Herod, A., Stokes, B., Hancock, P. and Kandiyot, R., "*Effect Of H2-Pressure On The Structures Of Bio-oils From The Mild Hydropyrolysis Of Biomass*", Biomass and Bioenergy, 5, 2, pp. 155-171, 1993] which is incorporated by reference. High total volatiles yield was noted (bio-oil plus gases) for wood pyrolysis at 400° C. to 700° C. and up to about 40 bar. A significant decrease in the mass average molecular weight of oxygenated compounds present was observed for 400° C. wood pyrolysis at 40 bar versus 1 bar but only a minor decrease of the number average molecular weight. This would indicate the production of smaller molecules from large chemical species (i.e. molecular mass of about >300 Daltons). This would indicate that non-catalytic treatment of pyrolysis vapors with hydrogen does not produce synthesis gas nor producer gas, however, a reduction in the molecular weight of oligomers (biopolymer fragments) is likely observed at elevated hydrogen partial pressures within the range of 400° C. to 500° C. Thus the use of elevated hydrogen pressures within pyrolysis gas during the hydropyrolysis step only is beneficial, but insufficient, to reduce depositable tars to acceptable levels. However, this data would indicate that elevated hydrogen partial pressure is beneficial in reducing depositable tars downstream of hydropyrolysis, especially for entrained aerosols containing biopolymer oligomers.

A calculated example of light gas equilibrium is shown in FIG. 2. FIG. 2 shows a typical calculated equilibrium of $CH_4$, $H_2$, $H_2O$, CO and $CO_2$ at 10 bara total pressure. Once light oxygenated hydrocarbons have been catalytically cracked and reacted to form primarily methane and water, residual high molecular weight biopolymer fragments will be exposed to a gaseous environment more similar to one described in FIG. 2 than pyrolysis vapor plus hydrogen-rich sweep gas. It can be seen from FIG. 2 that elevated temperatures of >500° C. and more preferably >600° C. and most preferably >700° C. are favored to maintain a high partial pressure of hydrogen.

Calculations show that increased pressure shifts the $CH_4$ and $H_2O$ curves to the left with increased $H_2$ partial pressure for a given temperature from those on FIG. 2. This indicates that increased hydrogen partial pressure is achieved throughout the process by operating at increased, but still moderate, system pressures and is further enhanced by the presence of excess hydrogen gas beyond the minimum required for chemical conversion. Excess hydrogen gas would be indicated by a significant hydrogen gas content of the catalyst bed output gas stream (13).

One metric of the excess hydrogen in the system is a $H_2$ stoichiometric ratio or "H2Stoich". A H2Stoich=1.0 is defined here as the theoretical amount of hydrogen to convert all pyrolysis gas carbon to $CH_4$ and all oxygen to water according to reaction 1. FIG. 2 was calculated at H2Stoich=1.0.

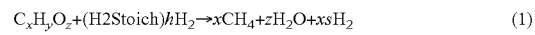

$$C_xH_yO_z+(H2Stoich)hH_2 \rightarrow xCH_4+zH_2O+xsH_2 \qquad (1)$$

where: h=(2z+4x−y)/2 and xs=0 when H2Stoich=1

The disclosed method includes an exposure of process gases and aerosols to temperatures above the hydropyrolysis temperature by at least 25° C. or preferably about 100° C. or more preferably about 200° C. above the pyrolysis temperature subject to a maximum temperature of about 650° C. while in contact with catalyst.

It is known from published literature of thermogravimetric analysis (TGA) that individual lignocelluosic biopolymers thermally degrade at different rates over different temperature ranges. However, in all cases, thermal decomposition of biopolymers is enhanced by elevated temperatures. In the disclosed method, biopolymer fragments are created in the pyrolysis step most preferably in the temperature range of 400° C. to 550° C. Those compounds existing in vapor form and aerosol form within the pyrolysis gas at pyrolysis temperatures can be expected to further degrade by (mildly endothermic) cracking on a catalyst or by self-destruction at temperatures higher than pyrolysis. In this disclosed method, the pyrolysis gas is heated above the pyrolysis temperature by the exothermic formation of methane within the catalyst bed.

A partial list of the types of reactions (unbalanced) involving lignocellulose biopolymer pyrolysis includes reactions 2 and 3. A significant fraction of the biopolymers have been decomposed to light oxygenates during pyrolysis.

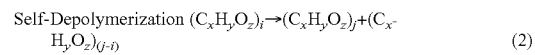

$$\text{Self-Depolymerization } (C_xH_yO_z)_i \rightarrow (C_xH_yO_z)_j + (C_xH_yO_z)_{(j-i)} \qquad (2)$$

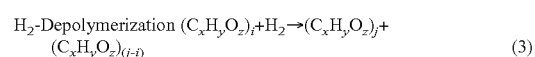

$$H_2\text{-Depolymerization } (C_xH_yO_z)_i + H_2 \rightarrow (C_xH_yO_z)_j + (C_xH_yO_z)_{(j-i)} \qquad (3)$$

A partial list of the types of reactions involving pyrolysis gas compounds include:

| | | |
|---|---|---|
| Oxygenate Cracking | $C_xH_yO_z \rightarrow C^* + C_iH_jO_k + C_nH_mO_o$ + light gas | (4) |
| Decarboxylation | $C_iH_jO_k \rightarrow C_{(i-1)}H_jO_{(k-2)} + CO_2$ | (5a) |
| Decarbonylation | $C_iH_jO_k \rightarrow C_{(i-1)}H_jO_{(k-1)} + CO$ | (5a) |
| Dehydration | $C_iH_jO_k \rightarrow C_iH_{(j-2)}O_{(k-1)} + H_2O$ | (5c) |
| Oxygenate Reforming | $C_iH_jO_k + mH_2O \rightarrow iCO + nH_2$ | (6) |
| Oxygenate H-Deoxygenation | $C_iH_jO_k + hH_2 \rightarrow C_iH_g + H_2O$ | (7) |
| Hydrogenation | $C_iH_jO_k + hH_2 \rightarrow C_iH_{(j+2h)}O_k$ | (8) |
| Aromatic dehydrogenation | $Ar-C_xH_yO_z + Ar-C_iH_jO_k \rightarrow PAH$ | (9) |

C* = if a catalyst is present, this represents coke on the catalyst.

The high number of chemical species known to be present in pyrolysis vapor and the large number of chemical reaction pathways (as shown by the large number of simultaneous and competing potential reactions above) make reaction modeling difficult or impossible.

Once light gases are formed they tend towards a complex equilibrium according to reactions 10 to 16. Key carbon-hydrogen-water-carbon oxides-methane reactions known in the art include:

| | | | |
|---|---|---|---|
| Combustion: | $C + O_2 \rightarrow CO_2$ | Exothermic | (10) |
| Boudard: | $C + CO_2 \leftarrow \rightarrow CO$ | Endothermic | (11) |
| Steam-Carbon: | $C + H_2O \rightarrow CO + H_2$ | Endothermic | (12) |
| Reverse Water Gas Shift: | $CO_2 + H_2 \leftarrow \rightarrow CO + H_2O$ | Endothermic | (13) |
| CO Methanation: | $CO + 3H_2 \rightarrow CH_4 + H_2O$ | Exothermic | (14) |
| Steam-Methane Reforming: | $CH_4 + H_2O \rightarrow CO_2 + 3H_2$ | Endothermic | (15) |
| (4) + (5) | $CO_2 + 4H_2 \leftarrow \rightarrow CH_4 + 2H_2O$ | Exothermic | (16) |

The light gases tend to approach a complex equilibrium established between CO, $CO_2$, $H_2$, $H_2O$ and $CH_4$ which is a function of temperature, pressure and overall gas composition. The reforming reaction 15 produces synthesis gas which increasingly dominates the equilibrium at temperatures above about 650° C. at the expense of methane and water.

In the disclosed method, oxygenated hydrocarbons within pyrolysis gas are catalytically cracked and reacted to preferentially form methane and water vapor with the consumption of hydrogen gas. This is preferably performed at temperatures less than about 650° C., under elevated hydrogen pressure and a H2Stoic greater than or equal to 1. In the disclosed method, light gases produced by oxygenate cracking and other reactions are reacted catalytically to better approach equilibrium. Oxygenate cracking activity and methane formation activity are both necessary characteristics of the catalyst used in the disclosed method.

Once formed, methane does not contribute to polymerization, condensation or other reactions which can increase molecular weight (and boiling points) of the compounds and oligomers remaining in the gas stream. In the disclosed process, the formation of methane is effectively an irreversible removal of depositable tar compounds from the gas stream.

As indicated in FIG. 2 at temperatures less than about 650° C., carbon oxides represent less than about 10 vol % of the light gas whereas methane and steam products of the methane forming reactions 14 and 16 constitute greater than about 55 vol %. Operation under these conditions tends to inhibit endothermic steam-methane reforming reaction 15 which would tend to form synthesis gas.

In the disclosed method, the pyrolysis gas reaction to from methane requires the use of a catalyst with both activity towards the cracking of light oxygenated hydrocarbons and activity towards the formation of methane. In this manner, the oxygenated hydrocarbons are effectively de-oxygenated by hydrogen gas supplied to the process with the formation of water as a product.

The formation of methane from oxygenates in pyrolysis gas produces water vapor and it has been calculated that the overall reaction is exothermic. However, the overall heat of reaction within the methane forming section of the catalyst bed is estimated to be significantly lower than what would be observed for the reaction of synthesis gas to methane (reaction 14) and results in a lower temperature rise in the catalyst bed as compared to what would normally be expected for methane production from CO+$H_2$. Without being bound by any theory, this is because of thermal coupling of endothermic cracking reactions occurring in short proximity of methane formation reactions within the catalyst particles. This allows catalyst bed operation below about 650° C. despite a preferred inlet pyrolysis gas temperature of about 450° C. to about 550° C.

Operation below about 650° C. avoids of the formation of PAH compounds. Once formed, PAH compounds are known to be difficult to destroy under the mild conditions in this disclosed method. Catalyst bed outlet temperatures of less than about 550° C. are preferred for the retention of substituted mono-aromatic or phenolic hydrocarbons in the product gas stream.

Without being bound by any theory, it is postulated that light oxygenates are rapidly catalytically cracked primarily by reactions 4 and 5a, b, c. Reactions 5a and 5b produce carbon oxides in the general vicinity of methane forming reaction sites (reactions 14 and reverse 15) within the catalyst particle and serve as the source of carbon for methane production. In addition, coke can be produced by cracking some oxygenate compounds (as per reaction 4) or the decomposition of light olefins (e.g. ethylene or propylene). Common catalysts, such as nickel or platinum, which are active for multiple reactions including methane formation (reactions 14 and reverse 15) are often active for de-oxygenation (reaction 7), steam reforming (reactions 15 and 6) and forward/reverse water gas shift (reaction 13). As such, cracked light gases tend to move towards equilibrium as per the example of FIG. 2.

Without being bound by any theory, it is postulated that the larger molecular weight oligomers (biopolymer fragments) also contained in the pyrolysis gas are the primary source for 'depositable tars'. The cellulose and hemi-cellulose ring structures are almost fully cracked to light oxygenated hydrocarbons and carbon oxides and decomposition is enhanced by both base and acid catalytic sites that are present on a variety of catalyst supports. These light gases rapidly catalytically reacted to form methane. However, lignin derived oligomers and large molecular fragments are more difficult to crack and fully decompose to be able to form methane or other hydrocarbons. Lignin is a large, complex bio-polymer consisting of linked aromatic rings often containing beta-ether bonds. Lignin is significantly different from cellulose and hemi-cellulose (which both contain oxygen within their primary repeating biopolymer rings). It is not necessary to fully decompose the lignin oligomers and lignin fragments to non-condensable gases but is sufficient to fragment multi-aromatic ring containing oligomers to form low boiling point mono-aromatic hydrocarbons or phenolic compounds which are not depositable tars.

As noted previously, HDO of residual non-deposit forming oxygenates is optionally performed on the catalyst output gas stream (13). The optional capture and separation of condensable non-methane hydrocarbons can create a valuable byproduct stream or reduce process problems created by phenol type compounds in the condensed water stream (22).

Generally, a desirable gas residence time within a catalytic reactor would be the gas residence time required to perform the primary reactions in order to minimize reactor volume and quantity of catalyst required. In the disclosed process, a gas residence time significantly in excess of the minimum required for the methane forming reaction is used to achieve low levels of 'depositable tar' compounds. Deposit forming tar aerosols (as well as char and coke) are exposed to hydrogen and steam for an extended period of time at temperatures elevated from the pyrolysis temperature and converted to non-deposit forming monomer, lighter hydrocarbons, oxygenates or non-condensable gases.

The disclosed method includes an extended time of exposure of pyrolysis gases and aerosols to temperatures above the hydropyrolysis temperature at least 5 seconds, preferably greater than 1 minute, more preferably greater than 10 minutes or most preferably greater than 1 hour subject to economic efficiency and operating conditions required to reduce depositable tars to acceptable levels. It should be noted that this is achieved without the addition of oxygen to raise the gas temperature. Optionally, additional cool hydrogen gas can be added to the catalytic reactor to reduced the operating temperature and raise the H/C ratio.

Without being bound by theory, it is believed that the catalytic formation of methane from cracked light oxygenated compounds occurs rapidly. Reductions in depositable tars are achieved by extending the gas residence time within one methanation reactor containing two sections (11,12), or optionally in an additional reactor (not shown in FIG. 1), after the majority of the methane forming reaction has been completed.

Without being bound by any theory, it is postulated that aerosols preferentially react homogeneously whereas vapors can react heterogeneously with catalyst present. Greatly extending the gas-catalyst contact time to well beyond 2 seconds is contrary to the teachings of Scott-325 and is accomplished at elevated pressure with excess hydrogen (and methane plus reaction product steam) present.

In the disclosed method, the pyrolysis gas reaction to from methane requires the use of a catalyst with both activity towards the cracking of light oxygenated hydrocarbons and activity towards the formation of methane and water from light gases. In the disclosed method it is preferred to use a supported metal catalyst.

One catalyst taught in Scott-935 to perform this function is nickel supported on moderately high surface area alumina. The lighter oxygenated compounds within the pyrolysis gas were quickly cracked and reacted to form methane as inferred by the <1 second gas residence times in fluidized beds described in Scott-935. It is known that alumina alone does not possess methane forming catalytic activity although it does perform oxygenate cracking very rapidly.

Preferred catalyst substrate materials have lower oxygenate cracking activity than moderately high surface area alumina but still sufficiently active towards oxygenate cracking to keep metallic catalytic sites sufficiently supplied with light gases for methane formation. Preferred catalyst substrate materials include slightly lower surface area alumina as well as high surface area silica, aluminosilicates, aluminophosphates and zeolites. Catalyst support materials with high oxygenate cracking activity are preferred with surface areas >10 sq.meters/gram and most preferred with surface areas from about 50 to 150 sq.meters/gram.

The cracking of some oxygenated species can result in carbon formation. It is desirable to reduce the net coke formation rate within the pores of catalyst particles. It is desirable to utilize support materials with oxygenate cracking activity plus higher activity for the steam gasification of coke as per reaction 12. Catalyst support materials which enhance char gasification rates (reactions 11 and 12) at about 500° C. to 650° C. include calcia, magnesia, zirconia, hafnia, ceria, titania and their mixtures plus alkali earth zirconates, titanates, hafniates, ceriates plus zirconia, hafnia, ceria and titania rich aluminates. Catalyst support materials with high steam-coke gasification activity are preferred with surface areas >10 sq.meters/gram, more preferred >50 sq.meters/gram and most preferred above about 100 sq.meters/gram.

The catalyst support materials noted do not have sufficient catalytic activity for the formation of methane. Finely divided metals dispersed upon the catalyst support materials are required to enhance the methane formation rate. A sufficiently high methane formation rate is required to provide excess reaction heat to raise the temperature of the catalyst and catalyst bed to a temperature sufficiently to enhance the thermal destruction of aerosols within the pyrolysis gas. Group VIII metals known to have high catalytic activity for the formation of methane from light gases include Ni, Pt, Ru, Rh, and Pd with the most common being nickel.

Most of these catalytic metals will catalyze multiple reactions. Pt and to a lesser extent Ni, are also catalytically active for C—C bond scission and C—O bond scission. This activity is useful in reacting monomer and dimer gases resulting from the fragmentation of oligomers within aerosols.

Metal promoted or dual metal catalysts include nickel or Pt plus Co, Mo, Cr, W, La and Fe. These dual metal catalysts can be used to impart additional thermal stability or sulfur tolerance to the nickel crystallites on the support material. Nickel and other metals can also be promoted with alkali and alkali earths such as K, Ca and Mg to enhance steam-coke gasification and oxygenate cracking.

Catalyst substrates are preferred in a physical form which imparts sufficient crush strength and abrasion resistance for operation within a moving bed while allowing gas flow. In addition, a particle shape is desired which avoids 'hang-up' and channeling within the catalyst bed.

In this disclosure, most preferred catalysts are nickel supported on alumina, aluminosilicate or zirconia with Mo or W additions for increased sulfur tolerance and promoted by calcia.

It is important to operate outside the coke stability region so as to avoid the formation of coke from the cracking of pyrolysis gas and light gas equilibrium reactions within the catalyst particles.

It is generally known that typical, dry, lignocellulosic biomass has an approximate molecular formula of $C_6H_9O_4$ which corresponds to H/C ratio of about 1.5 and O/C ratio of about 0.7. It is known that all forms of biomass pyrolysis result in oxygen within the biomass being preferentially partitioned to the gas/vapor phase. It is known from published literature that pyrolysis vapor from fast pyrolysis of lignocellulosic biomass typically has an H/C ratio of near 1.8 and an O/C ratio of near 0.8. The H/C and O/C ratios of both compositions are calculated to be well within the thermodynamic coke stability region for light gases.

Calculations of the coke stability region for the disclosed process based on light gases indicate that coke stability region can be avoided by maintaining a H/C ratio greater than about 4 and more preferably greater than about 5 and most preferably above about 5.5 for operation using pyrolysis gas with O/C ratios of less than about 2 at temperatures less than about 650° C. and total pressure less than about 50 atm.

Calculations based on known methane-coke equilibrium relationships at about 500° C. indicate that the boundary of the coke stability region would be achieved by maintaining a pyrolysis gas (including hydrogen and steam) feed mixture with an H/C ratio greater than about 5.3 while the O/C ration is about 1.7. Published literature for typical fast pyrolysis of wood containing about 8% water plus dry $H_2$ feed at an H2Stoich=1 calculates to give an H/C ratio of about 5.5 when about 11% of biomass carbon produced as char.

Operation with a net coke formation rate of zero is desirable. Coke steam-gasification requires at least some coke to be present within the catalyst, however, the level of coke in the catalyst must not be so high as to restrict mass transfer of gaseous reactants and products to and from catalytic sites within the catalyst particles. It is generally known that low levels of coke on catalysts, such as nickel on alumina, are acceptable for catalyst activity, however, coke levels in and above the range of 6-10% can significantly inhibit catalyst activity by pore plugging.

Operation under elevated pressures and excess hydrogen and high steam partial pressures (a product of methane formation) assists in increasing the chemical driving force for steam gasification of coke (reaction 12) and elevated temperature assists in reaction kinetics. In this manner, coke formed by cracking of some components of the pyrolysis gas is steam-gasified in the catalyst bed section (12) after the bed section performing the bulk of the methane formation (11).

In the disclosed process, it is either the rate of biopolymer oligomer decomposition or the rate of coke steam-gasification which determines the minimum extended gas residence time in the 'extended exposure time' reactor. Extended gas residence time is greatly enhanced by operation above atmospheric pressure. Both biopolymer oligomer decomposition and catalyst coke re-gasification are enhanced by elevating temperatures above the pyrolysis temperature.

Catalyst which as been deactivated by carbon deposition or sulfur poisoning can be regenerated in an off-line process and returned to the catalyst bed. At some point catalyst regeneration is no longer effective in restoring activity and fresh catalyst is required.

EXAMPLE

Figure 3:
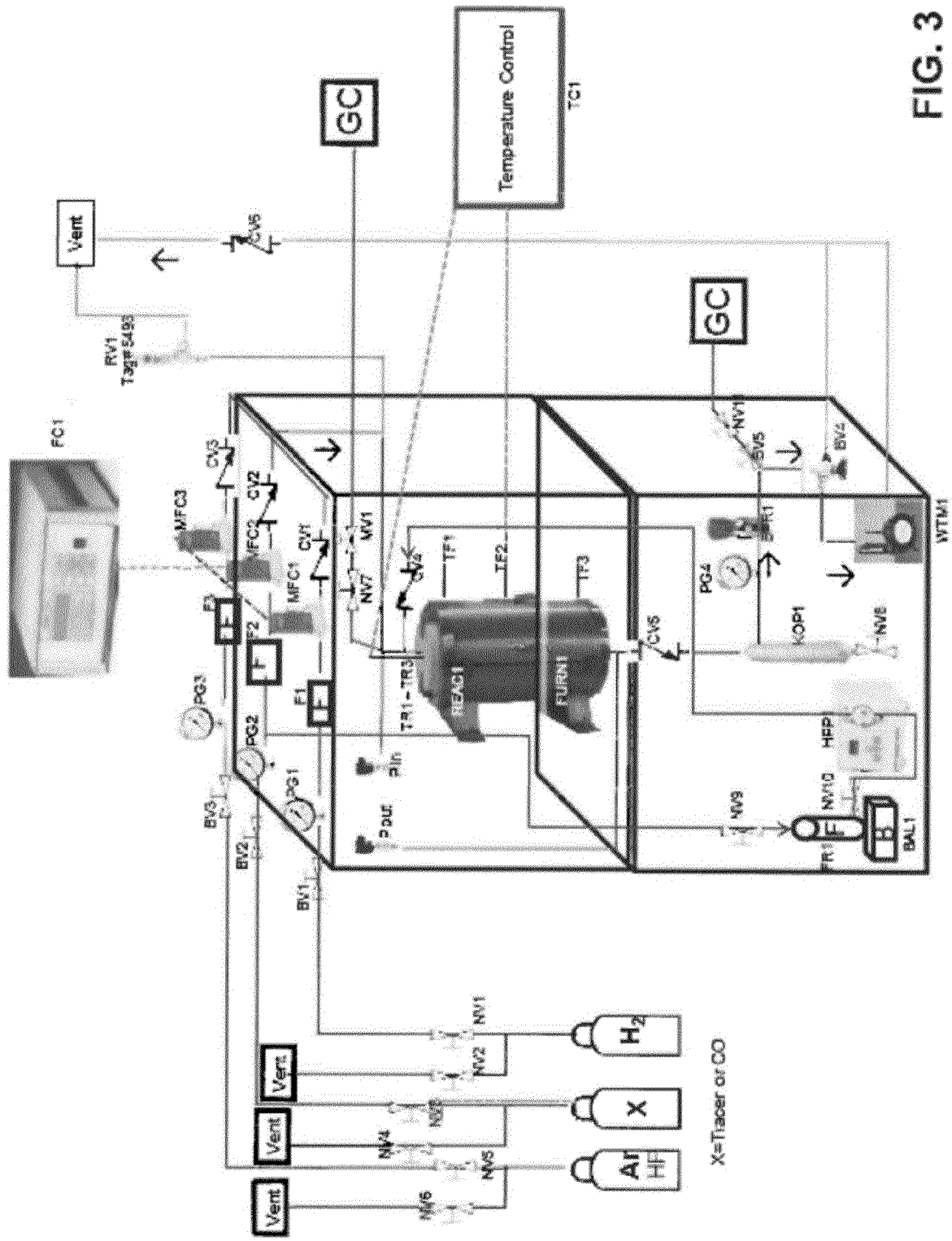
FIG. 3 illustrates one embodiment of a system according to the present invention.
Figure 4:
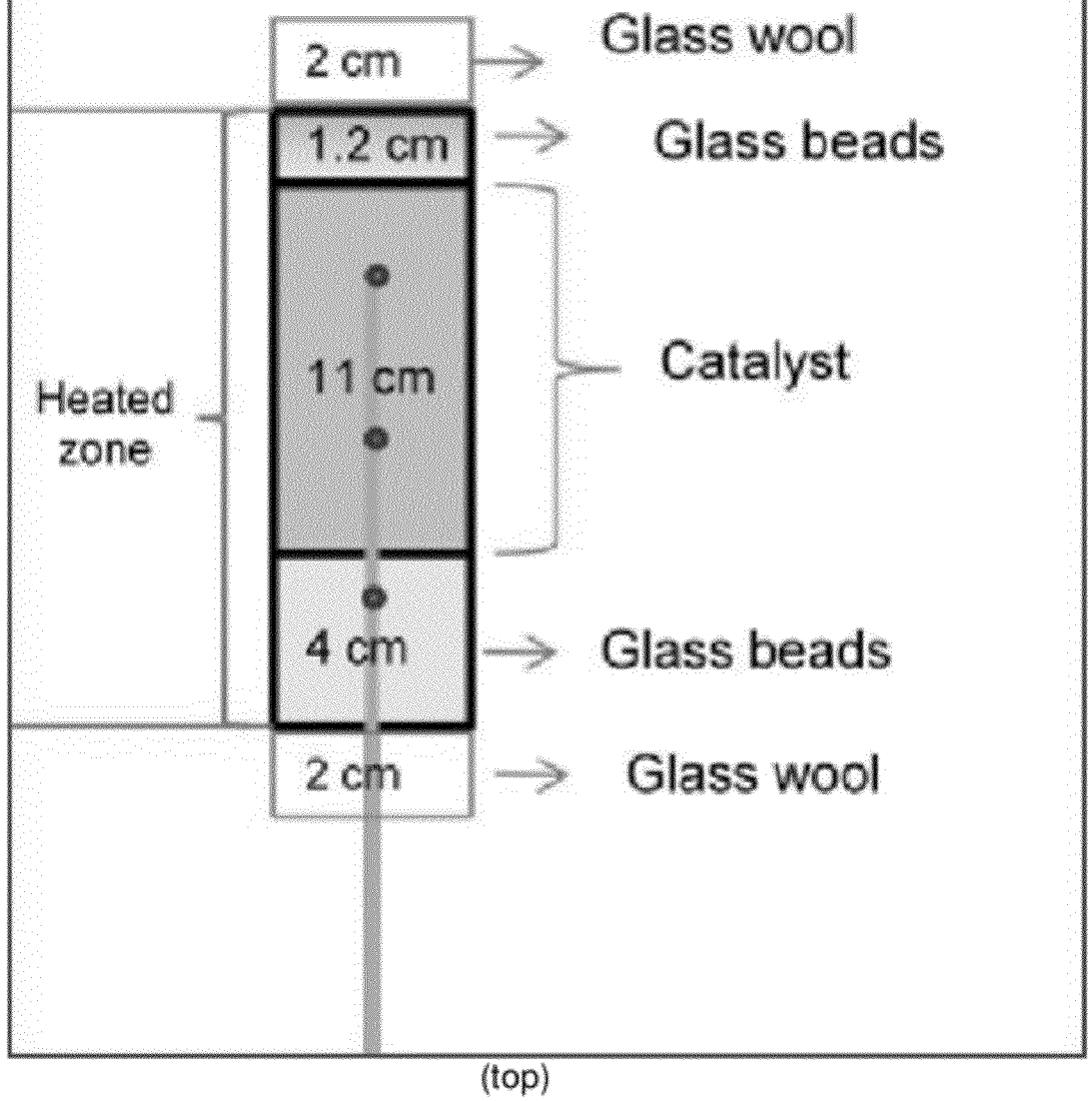
FIG. 4 illustrates one embodiment of a reactor system according to the present invention.

The catalytic conversion of pyrolysis gas to form methane with low depositable tar output was experimentally demonstrated in a laboratory system depicted in FIG. 3 with a vaporizer and reactor configuration shown in FIG. 4 (drawn inverted). Bio-oil produced from the fast pyrolysis of oat hulls was used as a surrogate for fast pyrolysis vapor. The bio-oil was vaporized in the top section of the reactor containing glass wool and glass beads. The bio-oil was analyzed to contain 27.08 wt % C, 8.94 wt % H, 62.63 wt % O, 1.22 wt % N, and 0.13 wt % S with a water content of 50 wt %. The bio-oil was input to the top of the reactor onto hot glass wool and glass beads with a flowing 95 vol % $H_2$-5 vol % Ar gas mixture. Vaporized bio-oil and gas flowed over a 1.7 cm diameter/25 $cm^3$ volume catalyst section consisting of −1 mm/+0.5 mm crushed Sud Chemie Meth-134 catalyst (nickel on alumina). Thermocouples were placed in the glass bead vaporization section, near the middle of the catalyst section and near the exit of the catalyst section as per FIG. 4.

A series of runs were undertaken with conditions described in TABLE 1. Run A was performed with no catalyst with no methane being formed and the majority of the bio-oil being re-condensed in a knock out pot (KOP1) operating near room temperature. A significant quantity of char was formed in the glass wool and glass bead sections in all runs (with and without catalyst) resulting in eventual reactor plugging and run termination. Runs with catalyst and at less than about 6.4 bara total pressure, higher char was formed indicating coke formation on the catalyst and, despite coke formation on the catalyst, high conversions of vaporized bio-oil to methane were observed. Low levels of $CO_2$ were observed in all runs. No CO was observed to be produced in all runs. Data for methane produced and char remaining are presented in FIG. 5. These data show a high methane conversion at all pressure and temperatures with catalyst present and a low level of carbon containing tar compounds captured in the knock out pot with condensed water.

In addition, a large reduction in char deposited within the reactor is observed at 21.5 bara pressure and 430° C. vaporization temperature and 11.3 bara pressure and 548° C. vaporization temperature. The output gas stream was analyzed for $H_2$, Ar, methane, CO and $CO_2$.

The temperature rise measured from inlet to mid-point within the catalyst bed cannot be considered conclusive with the small catalyst bed used in the laboratory set-up but generally supports the theoretical calculation of a mild exothermic reaction of pyrolysis vapors to methane.

A sample of condensate collected for runs D and F were solvent exchanged with dichloromethane and analyzed by GC-MS to identify primary compounds present. These results are presented in Table 2 and show that the dichloromethane extractable organic compounds present in the condensate from Run D (430° C. vaporization temperature, 460° C. catalyst mid-point temperature) were primarily mono-aromatic substituted phenol compounds which would not be considered to be depositable tars. The dichloromethane extractable organic compounds present in the condensate from Run F (548° C. vaporization temperature, 570° C. catalyst mid-point temperature) were low in phenols and the initial formation of naphthalenic compounds was detected.

Bio-oil vaporization temperatures of about 430° C. and a catalyst mid-point temperature of about 460° C. did not result in the detection of napthalenic compounds in condensate water. Initial traces of naphthalenic compounds were detected in Run F which operated with a catalyst mid-point temperature of about 570° C. and bio-oil vaporization temperatures of about 548° C.

These result show high conversion of bio-oil vapors to methane occurred in all tests with low carbon oxides produced. Almost all of the non-char carbon in the bio-oil feed was converted to methane. Decreasing char levels indicate a positive effect of hydrogen pressure on the volatilization of bio-oil while maintaining high conversion of vapors to methane, notably at 21.5 bara pressure at 430° C. vaporization temperature and also at 11.3 bara pressure and 548° C. vaporization temperature. These results support the positive impact of both elevated hydrogen pressure and temperature on biopolymer fragment decomposition with no or limited formation of PAH depositable tar compounds.

TABLE 1

Experimental Conditions And Results

| Run | | A | B | C | D | E | F |
|---|---|---|---|---|---|---|---|
| Catalyst | | Inert Glass | Ni-Al$_2$O$_3$ | Ni-Al$_2$O$_3$ | Ni-Al$_2$O$_3$ | Ni-Al$_2$O$_3$ | Ni-Al$_2$O$_3$ |
| Gas Input | | 95% H$_2$/ 5% Ar | 95% H$_2$/ 5% Ar | 95% H$_2$/ 5% Ar | 95% H$_2$/ 5% Ar | 95% H$_2$/ 5% Ar | 95% H$_2$/ 5% Ar |
| Liquid Input | | Bio-oil | Bio-oil | Bio-oil | Bio-oil | Bio-oil | Bio-oil |
| Pressure (outlet) | bara | 1.1 | 1.6 | 6.4 | 11.5 | 21.5 | 11.3 |
| Feed Bio-oil/Catalyst | g/g/hr | 0.6 | 0.6 | 0.6 | 0.6 | 0.6 | 0.6 |
| H$_2$ Feed/Bio-oil Feed | g/g | 0.2 | 0.2 | 0.2 | 0.2 | 0.2 | 0.2 |
| Temperature (inlet, avg) | °C. | 434 | 404 | 448 | 430 | 430 | 548 |
| Temperature (middle, avg) | °C. | 460 | 472 | 464 | 460 | 470 | 570 |
| Temperature (exit, avg) | °C. | 446 | 445 | 441 | 440 | 450 | 510 |
| H/C feed ratio | | 7.8 | 7.8 | 7.6 | 8.0 | 7.8 | 7.8 |
| O/C feed ratio | | 1.7 | 1.7 | 1.7 | 1.7 | 1.7 | 1.7 |
| Gas-Catalyst Contact Time (empty) | sec | 0.9 | 1.3 | 5 | 9 | 17 | 9 |
| Output (% of Carbon Input) | | | | | | | |
| C as char* | % C$_{input}$ | 24.4% | 33.2% | 30.9% | 28.7% | 14.6% | 10.8% |
| C in water condensate | % C$_{input}$ | 70.7% | 1.3% | 0.6% | 1.1% | 1.1% | 0.4% |
| C as CH$_4$ | % C$_{input}$ | 0.0% | 68.1% | 68.2% | 72.0% | 76.3% | 76.2% |
| C as CO and CO$_2$ | % C$_{input}$ | na | 0.7% | 0.0% | 0.0% | 0.0% | 0.4% |
| Unaccounted: (C$_{input}$-C$_{output}$)/C$_{input}$ | % C$_{input}$ | 4.9% | -2.6% | 0.3% | -1.9% | 8.0% | 12.6% |

*Bulk of char was deposited in vaporization section on glass wool upstream of catalyst section (visual observation, not quantified). Char determined by mass difference of reactor before and after run and includes char deposited on glass wool and glass beads in addition to coke on catalyst.

TABLE 2

Results Of GC-MS Analysis of Dichloromethane Extractable Fraction of Condensate

| Condensate from Run D | | Condensate from Run F | |
|---|---|---|---|
| Compound Identified | Relative Concentration | Compound Identified | Relative Concentration |
| Ethyl phenol | 15. | Benzene (butane diyl) bis | 1.6 |
| Dimethyl phenol | 4.8 | Dihydroquiniline | 1.2 |
| Trimethyl phenol | 3.6 | Benzenedicarboxylic acid | 0.46 |
| Phenol | 1.2 | Tetrahydro methoxy naphthalene | 0.46 |
| Octyne | 0.63 | Tetrahydro azulene | 0.39 |
| Benzenedicarboxylic acid | 0.43 | Dimethylethyl phenol | 0.35 |
| Ethyl butyl benzoic acid or Phenol, bis(dimethylethyl) | 0.22 | Bromoethyl phenol or Other alkyl phenol | 0.31 |
| Furfuryl trimethyl pyrazine | 0.17 | | |

One aspect of the present embodiment concerns a method for converting biomass to methane and light hydrocarbons with low levels of depositable tars, comprising:

a) a fast pyrolysis of lignocellulosic biomass using a hydrogen containing sweep gas at between about 400° C. and about 600° C. and at an elevated pressure of about 3 atm to about 50 atm to produce a hot pyrolysis gas mixture and a by-product containing char and ash;

b) passing the hot pyrolysis gas mixture containing hydrogen through a first section of a catalytic reactor to form a methane, steam and light hydrocarbon enriched gas stream at a temperature above step a) and less than about 650° C. without the addition of air or oxygen to induce the temperature rise;

c) providing an extended gas residence time within a second section of the catalytic reactor and at temperatures above the temperature of step a) and below about 650° C.; and d) cooling and separating the gas stream to output a useful methane-rich fuel gas plus by-product condensed light hydrocarbons and light oxygenates.

Another aspect of the present invention comprises using an extended gas residence time in the catalytic conversion reactor of from about 10 seconds to about 10 hours.

Another aspect of the present invention comprises using an extended gas residence time in the catalytic conversion reactor of from about 1 minute to about 1 hour.

Another aspect of the present invention comprises maintaining hydrogen gas in the catalytic conversion reactor.

Another aspect of the present invention comprises recovering and recycling hydrogen back to the process.

Another aspect of the present invention comprises performing the mai pyrolysis of biomass using flowing hydrogen gas as a sweep gas.

Another aspect of the present invention comprises using an impure hydrogen sweep gas containing significant fractions of hydrogen, steam, methane, carbon oxides or other non-oxygen gas.

Another aspect of the present invention comprises performing thermal pyrolysis under conditions considered to be flash pyrolysis, fast pyrolysis or rapid pyrolysis.

Another aspect of the present invention comprises perfoliming thermal pyrolysis in an auger fast pyrolysis reactor.

Another aspect of the present invention comprises inducing thermal pyrolysis by contacting pre-heated solid particles with biomass particles in an oxygen deficient atmosphere.

Another aspect of the present invention comprises performing thermal pyrolysis using fluidized bed, bubbling fluidized bed or circulating fluidized bed pyrolysis processes.

Another aspect of the present invention comprises performing thermal pyrolysis using ablative or rotating cone processes.

Another aspect of the present invention comprises enhancing pyrolysis vapor production by using finely divided catalytic materials mixed with the input biomass feed.

Another aspect of the present invention comprises enhancing pyrolysis vapor production by using catalytic or catalyst-coated media within the pyrolysis reactor.

Another aspect of the present invention comprises performing one or more non-catalytic process steps between steps a) and b) to chemically remove impurities in the hot pyrolysis gas mixture.

Another aspect of the present invention comprises performing one or more non-catalytic process steps between steps a) and b) to physically remove impurities such as char and ash entrained in the hot pyrolysis gas mixture.

Another aspect of the present invention comprises using a catalyst comprising nickel on an alumina support.

Another aspect of the present invention concerns using catalysts that are supported catalysts incorporating metals, metal oxides or metal sulfides having enhanced methane forming activity and a support active for the cracking of oxygenated hydrocarbons.

Another aspect of the present invention comprises using catalysts that contain metals, metal oxides or metal sulfides with activity towards the formation of methane, where the metal is selected from Ni, Pt, Rh, Ru, Pd, La, Co, Mo, Cr, Fe, W or mixtures thereof.

Another aspect of the present invention comprises using catalysts promoted with alkali or alkali earth oxides, ceria, zirconia, hafnia or mixtures thereof with enhanced activity for coke gasification by steam.

Another aspect of the present invention comprises using a catalyst wherein the catalyst support is alumina, aluminosilicate, titania, zirconia, hafnia, ceria, zirconium silicate, aluminum phosphate, silica or zeolites with activity towards cracking oxygenated hydrocarbons.

Another aspect of the present invention comprises using a catalyst where the catalyst support is alumina, aluminosilicate, titania, zirconia, hafnia, ceria, zirconium silicate, aluminum phosphate, silica or zeolites with activity towards coke re-gasification with steam.

Another aspect of the present invention comprises cooling after step b) to maintain reaction temperatures below about 650° C.

Another aspect of the present invention comprises performing steps b) and c) with an H/C ratio of greater than about 4 to reduce coke formation.

Another aspect of the present invention comprises performing steps b) and c) with an H/C ratio of greater than about 5 to reduce coke formation.

Another aspect of the present invention comprises performing steps b) and c) with an H/C ratio of greater than about 5.5 to reduce coke formation.

Another aspect of the present invention comprises performing steps b) and c) with an O/C ratio of less than about 2.5. Another aspect of the present invention comprises performing steps b) and c) with an O/C ratio of less than about 2.

Another aspect of the present invention comprises performing steps b) and c) with an O/C ratio of less than about 1.8.

Another aspect of the present invention comprises performing steps b) and c) in a single reactor.

Another aspect of the present invention comprises performing b) and c) in separate reactors.

Another aspect of the present invention comprises circulating catalyst from reactor sections performing step c) to reactor sections performing step b).

Another aspect of the present invention comprises circulating catalyst from a reactor performing step c) to a reactor performing step b).

Another aspect of the present invention comprises performing step b) in a circulating fluidized bed or riser reactor.

Another aspect of the present invention comprises circulating catalyst by mechanical or gas entrained flow means.

Another aspect of the present invention comprises employing an additional catalyst bed after step c) to perform additional hydrodeoxygenation of residual oxygenated aromatic or oxygenated hydrocarbon compounds remaining in the gas stream after step d).

Another aspect of the present invention comprises employing an additional catalyst bed after step c) to perform partial steam reforming of the methane product with subsequent shift reaction to create hydrogen for recycle back to the process after product separation.

Another aspect of the present invention comprises inputting hydrogen to step a) and/or step b), wherein the hydrogen is:

recycled from subsequent stages of the process such as gas separation;

generated by the steam reforming of hydrocarbon gas produced;

generated by the steam reforming of waste gases from gas separation processes;

generated by the gasification of char from pyrolysis;

generated by steam reforming using heat from the combustion of char;

generated by steam reforming using heat from the combustion of waste gases from gas separation processes;

generated by steam reforming or gasification using water recovered from the methane forming reaction is produced externally to the process; and any combination of the above.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A method for converting biomass to methane and light hydrocarbons with low levels of depositable tars, comprising:
   a) a fast pyrolysis of lignocellulosic biomass using a hydrogen containing sweep gas at between about 400° C. and about 600° C. and at an elevated pressure of about 3 atm to about 50 atm to produce a hot pyrolysis gas mixture and a by-product containing char and ash;
   b) passing the hot pyrolysis gas mixture containing hydrogen through a first section of a catalytic reactor to form a methane, steam and light hydrocarbon enriched gas stream at a temperature above step a) and less than about 650° C. without the addition of air or oxygen to induce the temperature rise;

c) providing an extended gas residence time within a second section of the catalytic reactor and at temperatures above the temperature of step a) and below about 650° C.; and d) cooling and separating the gas stream to output a useful methane-rich fuel gas plus by-product condensed light hydrocarbons and light oxygenates.

2. The method of claim 1 where the extended gas residence time in the catalytic conversion reactor is from about 10 seconds to about 10 hours.

3. The method of claim 1 where excess hydrogen gas is maintained in the catalytic conversion reactor, and where any hydrogen is recovered and recycled back to the process.

4. The method of claim 1 where thermal pyrolysis of biomass is performed using flowing hydrogen gas as a sweep gas, and wherein the hydrogen sweep gas is impure and contains significant fractions of hydrogen, steam, methane, carbon oxides or other non-oxygen gas.

5. The method of claim 1 where hydrogen is input in steps a) and b) separately.

6. The method of claim 1 where the thermal pyrolysis is performed under conditions considered to be flash pyrolysis, fast pyrolysis or rapid pyrolysis, and wherein thermal pyrolysis is performed in an auger fast pyrolysis reactor.

7. The method of claim 1 where the thermal pyrolysis is induced by contacting pre-heated solid particles with biomass particles in an oxygen deficient atmosphere.

8. The method of claim 1 where thermal pyrolysis is performed using fluidized bed, bubbling fluidized bed or circulating fluidized bed pyrolysis processes.

9. The method of claim 1 where thermal pyrolysis is performed using ablative or rotating cone processes.

10. The method of claim 1 where pyrolysis vapor production is enhanced by using finely divided catalytic materials mixed with the input biomass feed.

11. The method of claim 9 where the pyrolysis vapor production is enhanced by catalytic or catalyst coated media within the pyrolysis reactor.

12. The method of claim 1 where one or more non-catalytic process steps are performed between steps a) and b) for the chemical removal of impurities in the hot pyrolysis gas mixture, or where one or more non-catalytic process steps are performed between steps a) and b) for the physical removal of impurities such as char and ash entrained in the hot pyrolysis gas mixture.

13. The method of claim 1 comprising:
using a catalyst comprising nickel on an alumina support;
using catalysts comprising supported catalysts incorporating metals, metal oxides or metal sulfides having enhanced methane forming activity and a support active for the cracking of oxygenated hydrocarbons, where the metal is selected from Ni, Pt, Rh, Ru, Pd, La, Co, Mo, Cr, Fe, W or mixtures thereof; or
using a catalyst promoted with alkali or alkali earth oxides, ceria, zirconia, hafnia or mixtures thereof with enhanced activity for coke gasification by steam.

14. The method of claim 1 where cooling is used after step b) used to maintain reaction temperatures below about 650° C.

15. The method of claim 1 where steps b) and c) are performed with an H/C ratio of from greater than about 4 to about 5.5 to reduce coke formation.

16. The method of claim 1 where steps b) and c) are performed with an O/C ratio of less than about 2.5.

17. The method of claim 1 where steps b) and c) are performed in a single reactor or are performed in separate reactors.

18. The method of claim 1 where catalyst is circulated from reactor sections or a reactor performing step c) to reactor sections or a reactor performing step b).

19. The method of claim 1 where step b) is performed in a circulating fluidized bed or riser reactor.

20. The method of claim 1 where an additional catalyst bed is employed after step c) to perform additional hydrodeoxygenation of residual oxygenated aromatic or oxygenated hydrocarbon compounds remaining in the gas stream after step d), or where an additional catalyst bed is employed after step c) to perform partial steam reforming of the methane product with subsequent shift reaction to create hydrogen for recycle back to the process after product separation.

21. The method of claim 1 where hydrogen is input to step a) and/or step b) which includes hydrogen that is:
recycled from subsequent stages of the process such as gas separation;
generated by the steam reforming of hydrocarbon gas produced;
generated by the steam reforming of waste gases from gas separation processes;
generated by the gasification of char from pyrolysis;
generated by steam reforming using heat from the combustion of char;
generated by steam reforming using heat from the combustion of waste gases from gas separation processes;
generated by steam reforming or gasification using water recovered from the methane forming reaction
is produced externally to the process;
any combination of the above.

* * * * *